US012641603B2

(12) United States Patent
Bang et al.

(10) Patent No.: US 12,641,603 B2
(45) Date of Patent: May 26, 2026

(54) USER EQUIPMENT AND BASE STATION THAT COMMUNICATE WITH EACH OTHER AND OPERATING METHOD THEREOF

(71) Applicant: SAMSUNG ELECTRONICS CO., LTD., Suwon-si (KR)

(72) Inventors: Jonghyun Bang, Suwon-si (KR); Jungmin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 18/186,636

(22) Filed: Mar. 20, 2023

(65) Prior Publication Data

US 2023/0300838 A1 Sep. 21, 2023

(30) Foreign Application Priority Data

Mar. 21, 2022 (KR) ........................ 10-2022-0034941
Jun. 21, 2022 (KR) ........................ 10-2022-0075775

(51) Int. Cl.
*H04W 72/1273* (2023.01)
*H04W 72/23* (2023.01)
*H04W 72/54* (2023.01)

(52) U.S. Cl.
CPC ....... *H04W 72/1273* (2013.01); *H04W 72/23* (2023.01); *H04W 72/54* (2023.01)

(58) Field of Classification Search
CPC . H04W 72/2173; H04W 72/23; H04W 72/54; H04W 72/232
See application file for complete search history.

(56) References Cited

U.S. PATENT DOCUMENTS

| | | | | |
|---|---|---|---|---|
| 8,989,016 | B2 * | 3/2015 | Xiao ................... | H04L 25/0204 370/329 |
| 11,711,192 | B2 * | 7/2023 | Papasakellariou .... | H04L 1/1861 370/329 |
| 2017/0026904 | A1 * | 1/2017 | Ode ...................... | H04W 48/18 |

(Continued)

FOREIGN PATENT DOCUMENTS

| | | |
|---|---|---|
| KR | 10-2021-0122417 | 10/2021 |
| KR | 10-2021-0126289 | 10/2021 |
| WO | 2021201533 | 7/2021 |

OTHER PUBLICATIONS

European Search Report dated Aug. 17, 2023 in corresponding European Patent Application No. 23163240.7, 10 pages.

(Continued)

*Primary Examiner* — Rasheed Gidado
(74) *Attorney, Agent, or Firm* — Morgan, Lewis & Bockius LLP

(57) ABSTRACT

An operating method of a user equipment (UE) includes receiving a physical downlink control channel (PDCCH) from a base station (BS), wherein the PDCCH corresponds to a cell group including a plurality of cells, and wherein the PDCCH is received through a certain cell of the cell group; acquiring downlink control information (DCI) from the PDCCH, identifying whether scheduling has been performed on the cell group based on the DCI, and receiving physical downlink shared channels (PDSCHs) from the base station (BS) based on the DCI, wherein the PDSCHs correspond to the cell group and are received through the plurality of cells.

18 Claims, 30 Drawing Sheets

(56)     References Cited

U.S. PATENT DOCUMENTS

| 2017/0311206 | A1* | 10/2017 | Ryoo | H04W 24/02 |
| 2018/0123769 | A1* | 5/2018 | Pelletier | H04L 5/001 |
| 2021/0377996 | A1 | 12/2021 | Lee | |
| 2022/0015128 | A1 | 1/2022 | Liao et al. | |
| 2022/0046662 | A1 | 2/2022 | Takeda et al. | |
| 2022/0053540 | A1 | 2/2022 | Takeda et al. | |
| 2022/0061066 | A1 | 2/2022 | Zhou et al. | |
| 2022/0322310 | A1* | 10/2022 | Laddu | H04W 72/23 |
| 2023/0217458 | A1* | 7/2023 | Bang | H04W 48/12 |
| | | | | 370/329 |

OTHER PUBLICATIONS

Potevio: "DL control enhancements for Rel-13 CA", 3GPP TSG RAN WG1 Meeting #81, Fukuoka, Japan, May 25-29, 2015, 3 pages.
NEC: "Multi-cell PDSCH scheduling via a single DCI", 3GPP TSG RAN WG1#105-e, e-Meeting, May 19-May 27, 2021, 4 pages.
Samsung: "Remaining issues for cross-carrier scheduling in CA with up to 32 CCs", 3GPP TSG RAN WG1 #81, Fukuoka, Japan, May 25-29, 2015, 3 pages.

* cited by examiner

FIG. 2

Frequency

Time

⊠ : CORESET#1

▨ : CORESET#2

FIG. 7A

| Downlink control information |
| Cell group indicator<br>(y bit) |

FIG. 7B

Cell group entry

CG#11, CG#21, CG#31, CG#41

| Code | Cell group |
|------|-----------|
| 00 | CG#11 |
| 01 | CG#21 |
| 10 | CG#31 |
| 11 | CG#41 |

FIG. 7C

| Cell entry |
|---|
| C#11, C#21, C#31, C#41, C#51, C#61 |

| Bitmap | Cell | |
|---|---|---|
| 000111 | C#11, C#21, C#31 | CG#12 |
| 111000 | C#41, C#51, C#61 | CG#22 |

FIG. 8

| Downlink control information |
|---|
| Carrier indicator<br>(Including cell group indicator) |

FIG. 9

| Downlink control information |
| Time domain resource assignment<br>(Based on scheduling configuration for cell group) |

START

PERFORM BLIND DECODING ON PDCCH    — S300c

IDENTIFY SCHEDULING ON CELL GROUP BASED ON RNTI USED FOR SUCCESSFUL BLIND DECODING    — S310c

RECEIVE PDSCH BY CONSIDERING SCHEDULING ON CELL GROUP    — S320c

END

IDENTIFY SECONDARY CELLS INCLUDED IN CELL GROUP ⌐S421

SIMPLIFY PDCCH MONITORING OPERATION BY CONSIDERING IDENTIFIED SECONDARY CELLS ⌐S422

FIG. 16

USER EQUIPMENT AND BASE STATION THAT COMMUNICATE WITH EACH OTHER AND OPERATING METHOD THEREOF

CROSS-REFERENCE TO RELATED APPLICATIONS

Application No. 10-2022-0034941, filed on Mar. 21, 2022 and 10-2022-0075775, filed on Jun. 21, 2022, in the Korean Intellectual Property Office, the contents of which are incorporated by reference herein in their entireties.

BACKGROUND

The present disclosure relates to wireless communication, and particularly to a user equipment (UE) and a base station (BS) performing communication with each other based on a certain network, and an operating method thereof.

Next-generation communication systems, such as new radio (NR) communication systems, have been developed to meet the increasing use for wireless data traffic due to commercialization of long-term evolution (LTE) communication systems and an increase in multimedia services.

Accordingly, communication in the very high frequency (mmWave) band is proposed for the NR communication systems to increase a data rate. Additionally, beamforming, massive multi-input multi-output, full dimensional multi-input multi-output, array antenna, analog beam forming, and large-scale antenna technologies are used in the NR communication system to reduce pass loss of radio waves and increase a propagation distance of radio waves in the very high frequency band.

In some cases, communication is performed in a wide range of the band in next-generation communication systems, i.e., NR communication systems. For example, the band may be divided into a plurality of bands for efficient use of resources and network flexibility. A BS may communicate with a UE using a plurality of bands, and the BS transmits scheduling information of the bands to the UE through the bands. The BS may transmit scheduling information of each of the bands to the UE through efficient and effective resource allocation and the UE may effectively receive the scheduling information.

SUMMARY

Embodiments of the present disclosure include a base station (BS) that transmits scheduling information of each of a plurality of bands to a user equipment (UE). Accordingly, less resources are used which provides for effective use for resources and network flexibility. An embodiment of the disclosure includes a UE that receives scheduling information transmitted from a BS through reduced resources.

An embodiment of the disclosure includes a serving cell that generates pointing information and provides the pointing information to a UE. In some cases, the UE may identify a region matching a narrow band in a region of a coreset. According to an aspect of the present disclosure, an operating method of a user equipment including receiving a physical downlink control channel (PDCCH) is provided. In some cases, the physical downlink control channel corresponds to a cell group including a plurality of cells from a base station through a certain cell of the cell group; acquires downlink control information (DCI) from the PDCCH, identifies whether scheduling has been performed on the cell group based on the DCI, and receives physical downlink shared channels (PDSCHs) corresponding to the cell group from the base station through the plurality of cells based on the DCI.

According to another aspect of the present disclosure, an operating method of a base station including performing higher layer signaling for scheduling setting for a user equipment and a cell group is provided. In some cases, a user equipment and cell group generate downlink control information (DCI) including information indicating at least one of the cell group and a plurality of cells included in the cell group based on the higher layer signaling, select one cell from the plurality of cells based on the higher layer signaling, schedule a physical downlink control channel (PDCCH) including the DCI based on the selected cell and corresponding to the cell group, and transmit the scheduled PDCCH to the user equipment.

A user equipment including a transceiver configured to receive a physical downlink control channel (PDCCH) is provided. The physical downlink control channel corresponds to a cell group including a plurality of cells from a base station through a certain cell of the cell group and a controller configured to acquire downlink control information (DCI) from the PDCCH and identifies whether scheduling is performed on the cell group based on the DCI. The controller is configured to control the transceiver to receive physical downlink shared channels (PDSCHs) corresponding to the cell group from the base station through the plurality of cells based on the DCI.

According to another aspect of the present disclosure, a base station including a plurality of transceivers and a controller configured to control the plurality of transceivers to perform higher layer signaling for scheduling setting for user equipment and a cell group is provided. The controller is configured to generate downlink control information (DCI) including information indicating the cell group and at least one of a plurality of cells included in the cell group based on the higher layer signaling, select one cell of the plurality of cells based on the higher layer signaling, and perform scheduling on a physical downlink control channel (PDCCH) including the DCI based on the selected cell group and corresponding to the cell group.

According to another aspect of the present disclosure, a user equipment (UE) is provided that is configured to receive a physical downlink control channel (PDCCH) from a base station (BS) using a first cell of the cell group; acquire downlink control information (DCI) from the PDCCH, wherein the DCI includes scheduling information for the first cell and a second cell of the cell group; and receive physical downlink shared channels (PDSCHs) from the base station (BS) based on the DCI using the first cell and the second cell.

BRIEF DESCRIPTION OF THE DRAWINGS

Embodiments will be more clearly understood from the following detailed description taken in conjunction with the accompanying drawings in which:

FIGS. 2 and 3 are block diagrams illustrating an implementation of a base station and a user equipment according to an embodiment;

FIGS. 7 to 9 are diagrams illustrating scheduling-related information for a cell group;

FIG. 16 is a conceptual diagram illustrating application in an IoT network system.

DETAILED DESCRIPTION

Figure 1:
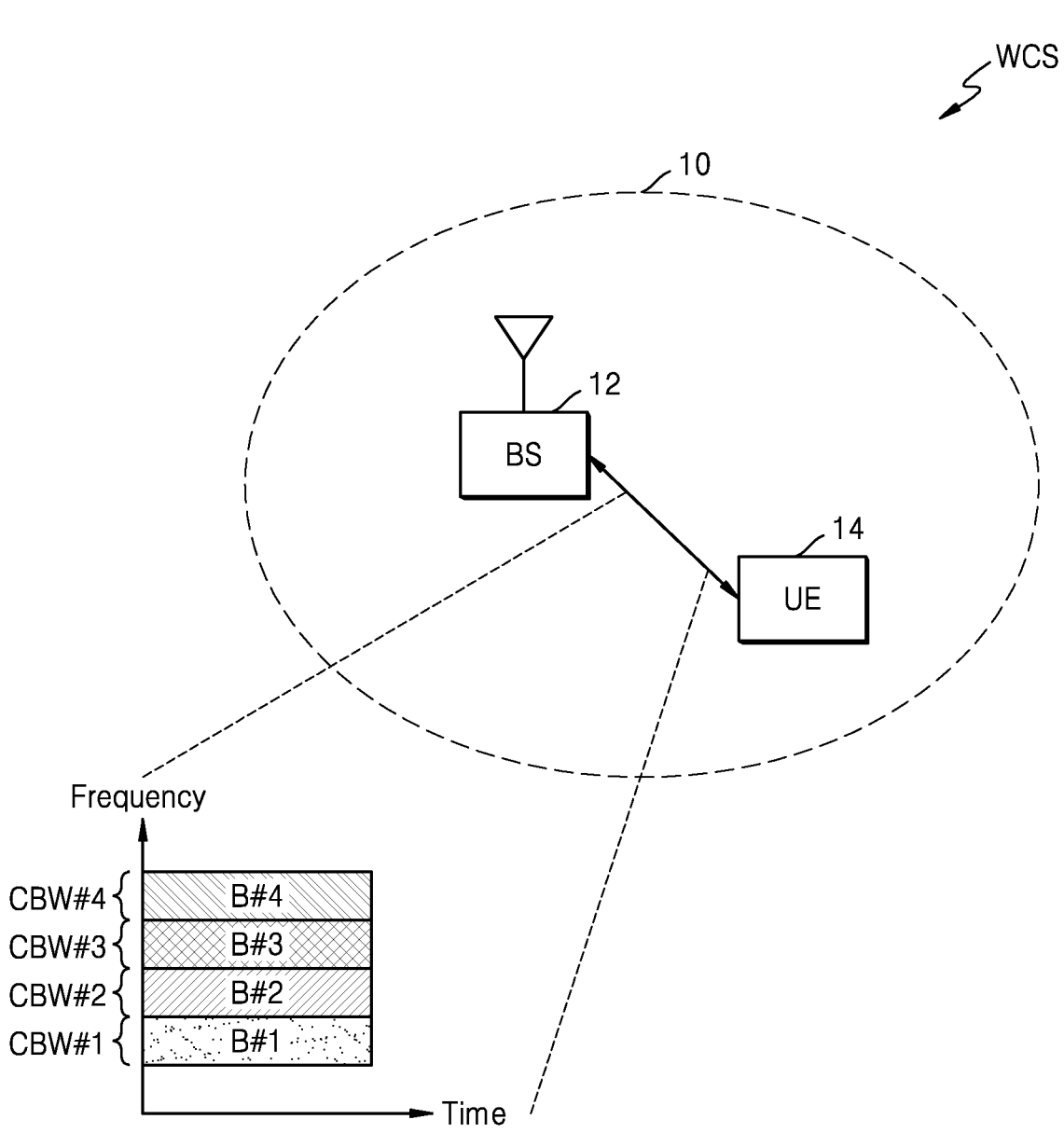
FIG. 1 is a diagram illustrating a wireless communication system according to an embodiment.

The present disclosure relates to a wireless communication system. Embodiments of the disclosure include a base station (BS) that transmits scheduling information of each of a plurality of bands to a user equipment (UE). Accordingly, less resources are used which provides for effective use of resources and network flexibility. For example, the UE may receive scheduling information transmitted from a BS through reduced resources. In some cases, a serving cell is provided that generates pointing information and provides the pointing information to a UE. Accordingly, the UE may effectively identify a region matching a narrow band in a region of a coreset.

Conventional new radio (NR) network communication systems include a band that is divided into a plurality of carrier bands and communication is performed using the plurality of carrier bands. A carrier band may be referred to as a cell and for data communication through cells, control channels are transmitted through each cell. Conventionally, a cross-carrier scheduling technique has been used in long-term evolution (LTE). However, a technology suitable for communication environment using multiple cells, such as NR, is required.

By contrast, the present disclosure describes systems and methods of receiving a physical downlink control channel (PDCCH) from a base station (BS) using a certain cell of the cell group. In some cases, a downlink control information (DCI) is obtained from the PDCCH. For example, the DCI includes scheduling information for the first cell and a second cell of the cell group. The user equipment receives physical downlink shared channels (PDSCHs) from the base station (BS) based on the DCI using the certain cell and a plurality of cells.

Embodiments of the present disclosure include a base station (BS) that performs scheduling in a cell group unit in communication using a plurality of cells and transmits a physical downlink control channel (PDCCH) including downlink control information (DCI) for a plurality of cells of a cell group to a user equipment (UE) through a specific cell in a cell group. The UE acquires the DCI from the PDCCH received through a specific cell, identifies scheduling for each cell group, and receives PDSCHs corresponding thereto. Thus, the BS may select a cell group as a scheduling unit and cells within the cell group to conform to a network environment performing communication using a large number of cells. Additionally, the UE may accurately identify the selected cell group and cells in the cell group, thereby increasing efficient use of communication resources and flexibility of the network.

The present disclosure may be modified in multiple alternate forms, and thus specific embodiments will be exemplified in the drawings and described in detail. In the present specification, when a component (or a region, a layer, a portion, etc.) is referred to as being "on," "connected to," or "coupled to" another component, it means that the component may be directly disposed on/connected to/coupled to the other component, or that a third component may be disposed therebetween.

Like reference numerals may refer to like components throughout the specification and the drawings. It is noted that while the drawings are intended to illustrate actual relative dimensions of a particular embodiment of the specification, the present disclosure is not necessarily limited to the embodiments shown. The term "and/or" includes all combinations of one or more of which associated configurations may define.

It will be understood that, although the terms "first," "second," etc. may be used herein to describe various components, these components should not necessarily be limited by these terms. These terms are only used to distinguish one component from another. For example, a first component could be termed a second component, and, similarly, a second component could be termed a first component, without departing from the scope of the inventive concept. The terms of a singular form may include plural forms unless the context clearly indicates otherwise.

Additionally, terms such as "below," "under," "on," and "above" may be used to describe the relationship between components illustrated in the figures. The terms are used as a relative concept and are described with reference to the direction indicated in the drawings. It should be understood that the terms "comprise," "include," or "have" are intended to specify the presence of stated features, integers, steps, operations, components, parts, or combinations thereof in the disclosure, but do not preclude the presence or addition of one or more other features, integers, steps, operations, components, parts, or combinations thereof.

Embodiments of the present disclosure include a new radio (NR) network-based carrier service. For example, the carrier service may be a wholesale carrier service (WCS) such as 3GPP release. The present disclosure is not limited to an NR network and may be applied to other wireless communication systems, for example, cellular communication systems, such as long-term evolution (LTE), LTE-advanced (LTE-A), wireless broadband (WiBro), global system for mobile communication (GSM), next-generation communication, such as 6G, or short-range communication systems, such as Bluetooth and near field communication (NFC), etc.

Additionally, various functions described below may be implemented or supported by artificial intelligence technology or one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in suitable computer-readable program code. The expression "computer-readable program code" includes any type of computer code, including source code, object code, and executable code. The expression "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory computer-readable medium includes media where data may be permanently stored and media where data may be stored and later overwritten, such as a rewritable optical disc or an erasable memory device.

In the embodiments described below, a hardware approach is described as an example. However, the embodiments include technology using both hardware and software, and thus, the embodiments do not exclude a software-based approach.

A wireless communication system of an embodiment is described with reference to the accompanying drawings, wherein a base station BS transmits scheduling information of each of the bands to a user equipment UE through efficient and effective resource allocation and the UE may effectively receive the scheduling information.

FIG. 1 is a block diagram illustrating a wireless communication system (WCS).

Referring to FIG. 1, a WCS may include a base station (BS) 12 and a user equipment (UE) 14. The BS 12 refers to a fixed station that communicates with the UE 14 and/or other BSs (not shown), and may exchange control information and data through communication with the UE 14 and/or other cells (not shown). For example, the BS 12 may be referred to as a node B, an evolved-node B (eNB), a next generation node B (gNB), a sector, a site, a base transceiver system (BTS), an access point (AP), a relay node, a remote radio head (RRH), a radio unit (RU), a small cell, a wireless device, a device, and the like.

According to the embodiments of the present disclosure, a wireless network may include a number of base stations and other network entities. A base station (BS) may be a station that communicates with UE. Each base station may provide communication coverage for a particular geographic area. In 3GPP, the term "cell" can refer to a coverage area of the base station and/or a coverage area depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network through various types of backhaul interfaces such as a direct physical connection, a virtual network, or the like using any suitable transport network.

UE 14 may be fixed or mobile, and may refer to any devices capable of communicating with BS 12 to transmit and receive data and/or control information to and from BS 12. For example, UE 14 may be referred to as a terminal, a terminal equipment, a mobile station (MS), a mobile terminal (MT), a user terminal (UT), a subscriber station (SS), a wireless communication device, a wireless device, a device, a handheld device, and the like.

BS 12 may provide wireless broadband access to UE 14 within coverage 10 thereof. As an example shown in FIG. 1, BS 12 may divide the entire band into first to fourth bands B #1 to B #4 and communicate with UE 14 using at least one of the first to fourth bands B #1 to B #4. The BS 12 may use a first component carrier for communication in the first band B #1, use a second component carrier for communication in the second band B #2, use a third component carrier for communication in the third band B #3, and use a fourth component carrier for communication in the fourth band B #4. The first to fourth bands B #1 to B #4 may have first to fourth carrier bandwidths CBW #1 to CBW #4 and the first to fourth carrier bandwidths CBW #1 to CBW #4 may either be the same, partially different or entirely different. However, in FIG. 1, four bands B #1 to B #4 are illustrated for understanding, but the scope of the present disclosure is not limited thereto and may be applied using more or less than four bands. In some cases, BS 12 may manage the bands as cells. Accordingly, communication using a certain band may be communication using a certain cell corresponding to the certain band. Thus, a band may be understood as the same concept as a cell.

According to an embodiment, BS 12 may perform scheduling in units of cell groups when performing communication using a plurality of cells. In some cases, the cells may be classified as at least one cell group and BS 12 may perform scheduling on the cell group. In some embodiments, a plurality of cell groups may be configured and BS 12 may perform scheduling on the cell groups. In some examples, scheduling on a cell group includes an operation of generating downlink control information (DCI) by performing resource scheduling on the cells of the cell group and transmitting a physical downlink control channel (PDCCH) including the DCI generated through a certain cell. Additionally, the certain cell refers to a cell selected for transmitting the PDCCH, among a plurality of cells of the cell group, and the certain cell may be selected as various embodiments, and details thereof are described below.

According to an embodiment, UE 14 may acquire the DCI from the received PDCCH, and identify whether scheduling for the cell group has been performed based on the acquired DCI. When UE 14 identifies that scheduling for the cell group has been performed, based on the acquired DCI, UE 14 may receive physical downlink shared channels (PDSCHs) corresponding to the cell group through a plurality of cells.

As an example shown in FIG. 1, the first to fourth cells corresponding to the first to fourth bands B #1 to B #4 respectively are included in one cell group and BS 12 performs communication using the first to fourth bands B #1 to B #4 with UE 14. The BS 12 may transmit the PDCCH including the DCI for the first to fourth cells to the UE 14 through a certain cell, among the first to fourth cells. The UE 14 may identify that scheduling for the cell group has been performed based on the DCI included in the received PDCCH, and may receive the PDSCHs transmitted through the first to fourth bands B #1 to B #4 based on the DCI.

According to an embodiment, BS 12 and UE 14 may perform higher layer signaling (e.g., radio resource control (RRC) signaling or medium access control elements (MAC CE)) for scheduling a setting for a cell group. In some cases, the scheduling setting for the cell group may be defined as a setting between BS 12 and UE 14 for UE 14 to identify at least one cell group, a plurality of cells included in the cell group, whether scheduling has been performed on the cell group, and the like. In some cases, higher layer signaling for scheduling setting for a cell group may include an operation of receiving performance information of UE 14 by BS 12. For example, the performance information of UE 14 may include at least one of cells supportable by UE 14, the number of supportable cells, and a method of selecting a certain cell. The performance information of UE 14 may be related to scheduling for a cell group. BS 12 may perform scheduling on the cell group based on the performance information of UE 14.

According to an embodiment, BS 12 may transmit a PDCCH including DCI for the cells through a certain cell among the cells to the user when communicating with UE 14 using a plurality of cells, thereby efficiently using resources and increasing network flexibility.

According to an embodiment, UE 14 may identify that the DCI included in the PDCCH received through a certain cell is for a plurality of cells, and receive the PDSCHs transmitted through the cells based on the DCI, thereby effectively supporting scheduling on the cell group of BS 12.

Figure 2:
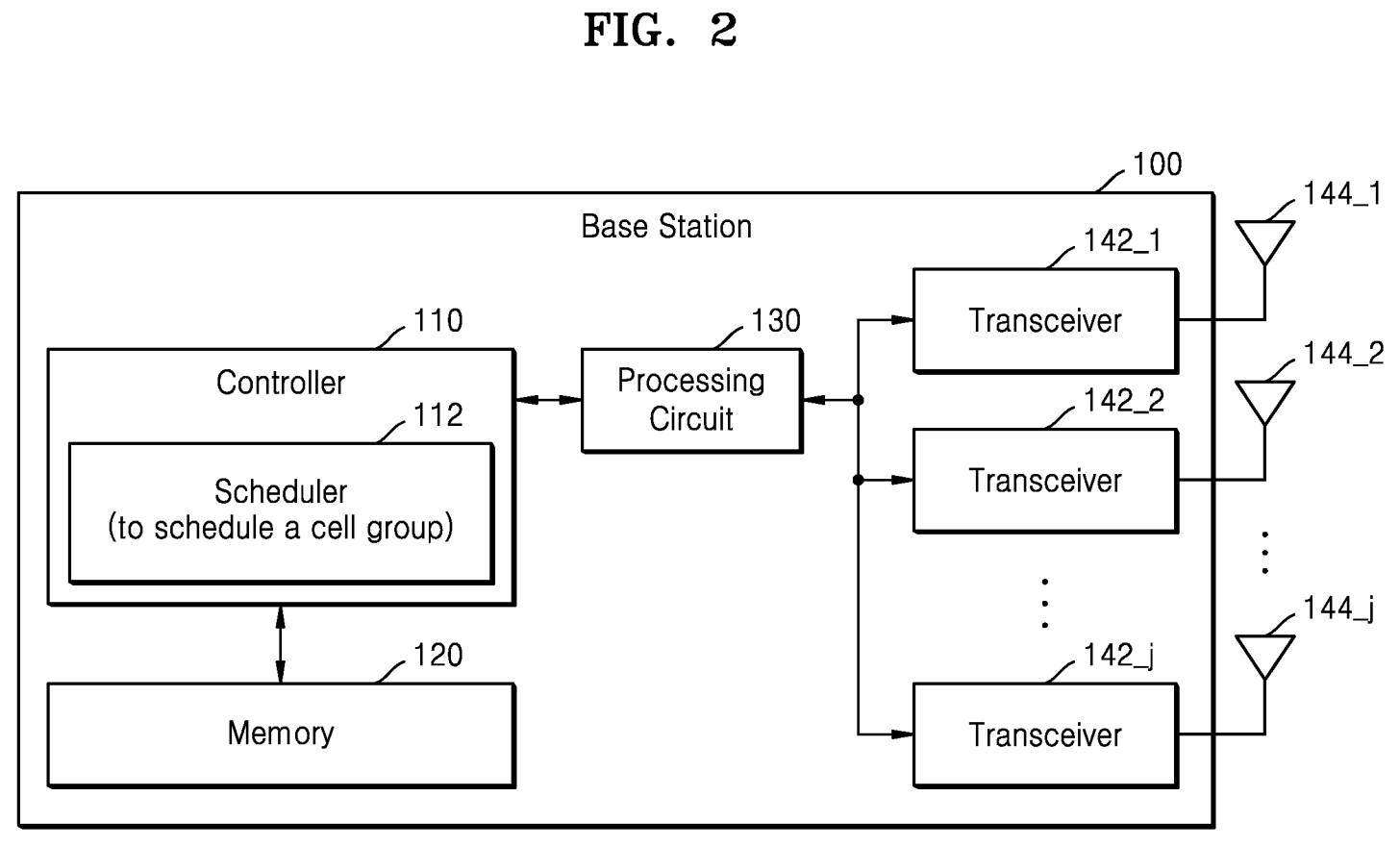
Figure 3:
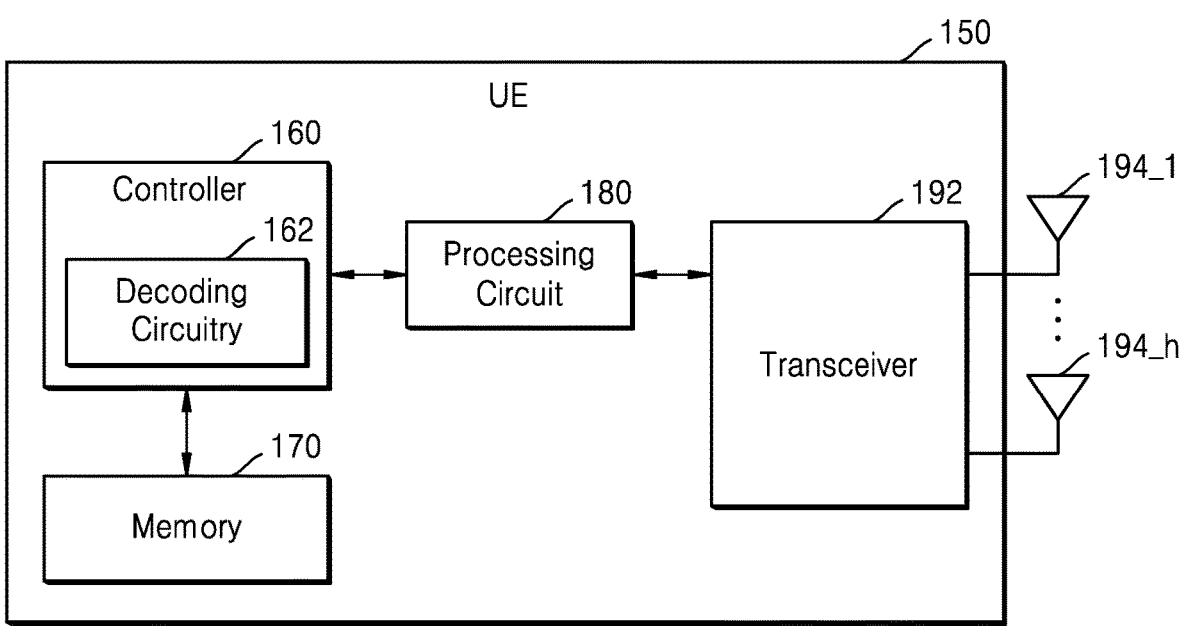

FIGS. 2 and 3 are block diagrams respectively illustrating a method of implementation of BS 100 and UE 150. The method of implementation of BS 100 and UE 150 of FIGS. 2 and 3 may be applied to BS 12 and UE 14 of FIG. 1, respectively.

Referring to FIG. 2, BS 100 may include controller 110, memory 120, processing circuit 130, a plurality of transceivers 142_1 to 142_j, and a plurality of antennas 144_1 to 144_j.

Memory 120 refers to memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Transceivers 142 may communicate bi-directionally, via antennas, wired, or wireless links. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem. Accordingly, the transceivers 142_1 to 142_j may receive RF signals transmitted from a UE within coverage through the antennas 144_1 to 144_j. The transceivers 142_1 to 142_j may frequency down-convert the received RF signals to generate intermediate frequency (IF) or baseband signals.

Antennas 144_1 to 144_j refer to a wireless device that may include a single antenna or more than one antenna. For example, the antenna may be capable of concurrently transmitting or receiving multiple wireless transmissions. In some cases, a wireless communication device may include an antenna array.

Processing circuit 130 may generate data signals by filtering, decoding, and/or digitizing the IF or baseband signals. Controller 110 may additionally process the data signals. Additionally, processing circuit 130 may receive data signals from controller 110. In some cases, processing circuit 130 may encode, multiplex, and/or convert the received data signals to analog.

The transceivers 142_1 to 142_j may frequency up-convert the IF or baseband signals output from processing circuit 130 and transmit the signals as RF signals to the UE through the antennas 144_1 to 144_j.

According to some embodiments of the present disclosure, controller 110 may control the BS 100 for NR network-based communication, and may include scheduler 112 that performs scheduling on a cell group including cells.

According to an embodiment, scheduler 112 may perform resource scheduling for transmitting a PDSCH for each of the cells, and may generate DCI including a resource scheduling result. Scheduler 112 may control processing circuit 130, transceivers 142_1 to 142_j, and antennas 144_1 to 144_j to transmit the PDCCH including the DCI to the UE through a certain cell among a plurality of cells.

According to an embodiment, scheduler 112 may include scheduling-related information for a cell group in at least one of a plurality of fields of the DCI. The UE may identify at least one of whether scheduling has been performed on the cell group and a plurality of cells included in the cell group based on the scheduling-related information for the cell group. In some cases, at least one field of the DCI for transmitting scheduling-related information for a cell group may include a reserved field and/or a field that is not used in the current situation so the field does not transmit information. In some cases, the DCI may include a newly defined field to transmit scheduling-related information for a cell group. Additionally, the DCI may be configured to have an optimized format for providing the scheduling-related information for a cell group.

Controller 110 may execute a program and/or a process stored in memory 120 to perform an overall control operation on the BS 100. In some cases, scheduler 112 may be stored in memory 120 as a program code that is executed to perform a scheduling operation. According to some embodiments of the present disclosure, controller 110 accesses memory 120 to execute the stored program code when the operation of scheduler 112 may be performed.

Referring to FIG. 3, UE 150 may include controller 160, memory 170, processing circuit 180, transceiver 192, and plurality of antennas 194_1 to 194_h.

Transceiver 192 may receive RF signals transmitted by the BS through antennas 194_1 to 194_h. In some cases, the BS includes the operations as described with reference to FIGS. 1 and 2. Transceiver 192 may down-convert the received RF signals into IF or baseband signals. Processing circuit 180 may generate data signals by filtering, decoding, and/or digitizing the IF or baseband signals. In some cases, controller 160 may additionally process the data signals.

Additionally, processing circuit 180 may receive data signals from controller 160. Processing circuit 180 may encode, multiplex, and/or convert the received data signals to analog. Transceiver 192 frequency up-converts the IF or baseband signals output from processing circuit 180 and transmits the signals as RF signals through antennas 194_1 to 194_h.

According to an embodiment, the controller may controls the UE for NR network-based communication, and may include decoding circuitry 162 that identifies whether scheduling has been performed on a cell group. In some cases, the identification is based on the PDCCH received from the BS and processing the DCI included in the PDCCH based on an identifying result.

According to an embodiment of the present disclosure, the decoding circuitry may perform blind decoding on the PDCCH to acquire DCI. In some cases, decoding circuitry 162 identifies whether scheduling has been performed on a cell group based on the acquired DCI. As described with reference to FIG. 2, the DCI may include scheduling-related information for the cell group. Decoding circuitry 162 may identify whether scheduling has been performed on the cell group by interpreting the scheduling-related information for the cell group based on the scheduling setting for the cell group. Furthermore, decoding circuitry 162 may identify a cell group and/or a plurality of cells for which the DCI acquired based on the scheduling-related information for the cell group is valid.

According to an embodiment, controller 160 may control processing circuit 180, transceiver 192, and antennas 194_1 to 194_h to receive PDSCHs corresponding to the cell group (or PDSCHs respectively corresponding to a plurality of cells) based on the acquired DCI.

Controller 160 may execute a program and/or a process stored in memory 170 to perform a control operation on the UE 150. According to some embodiments, decoding circuitry 162 may be stored in the memory 170 as program code executed to support scheduling for a cell group according to embodiments and controller 160 may access memory 170 to execute the stored program code, thereby performing an operation of decoding circuitry 162.

Figure 4A:
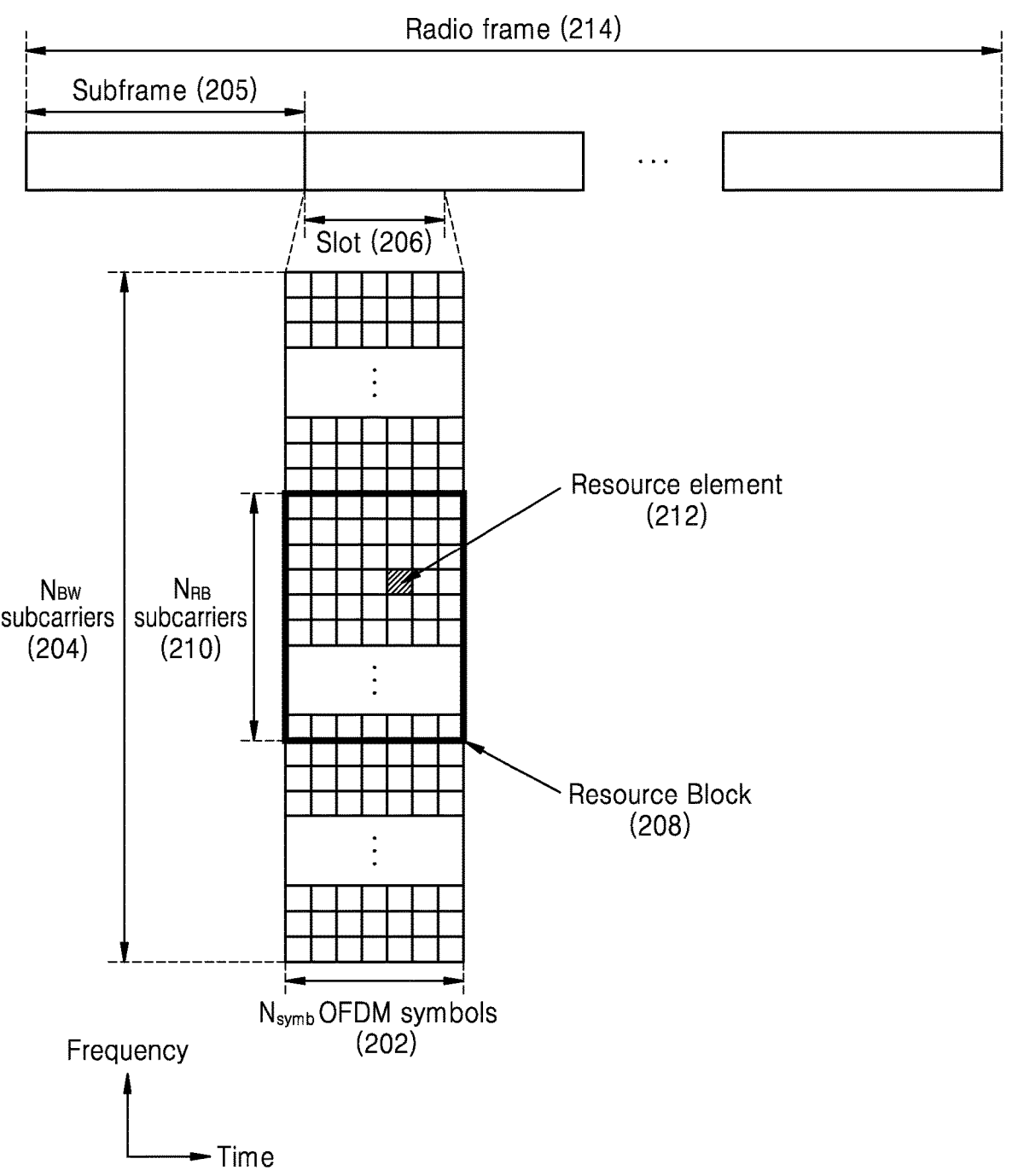
FIG. 4A is a diagram illustrating a structure of a time-frequency domain that is a radio resource region in a wireless communication system.
Figure 4B:
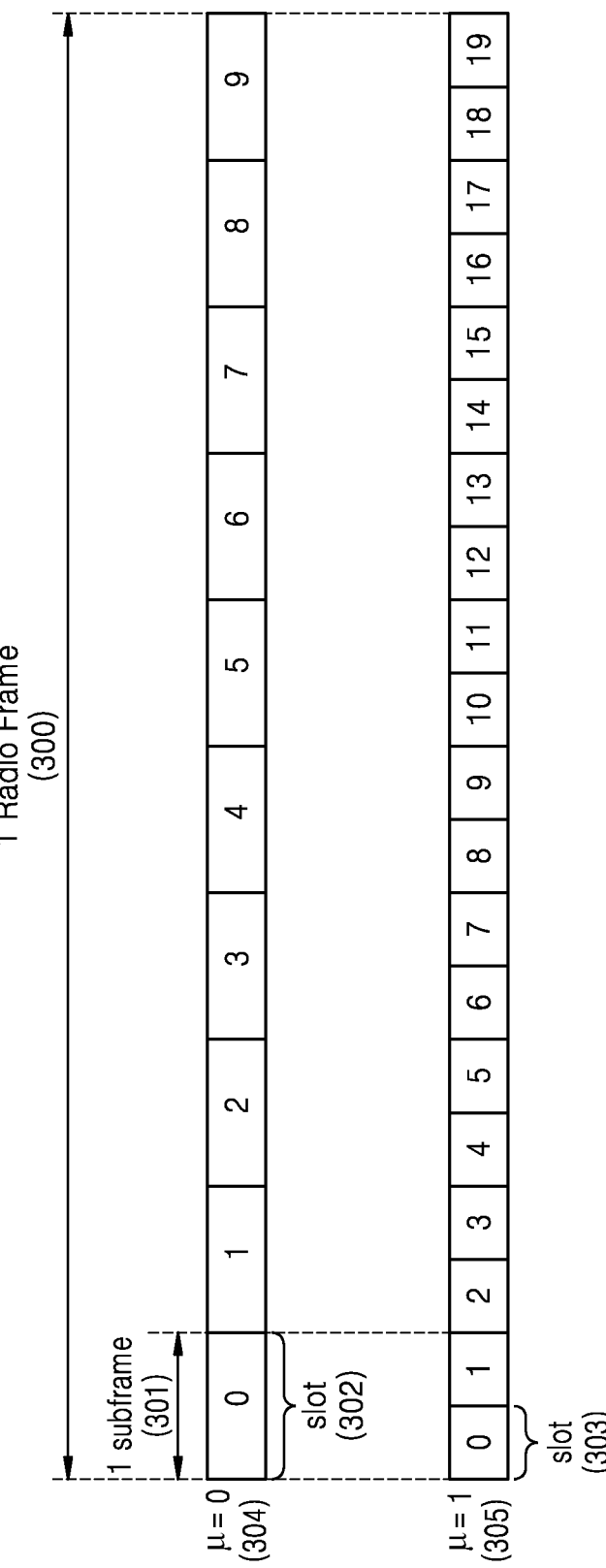
FIG. 4B is a diagram illustrating a slot structure in a wireless communication system.
Figure 4C:
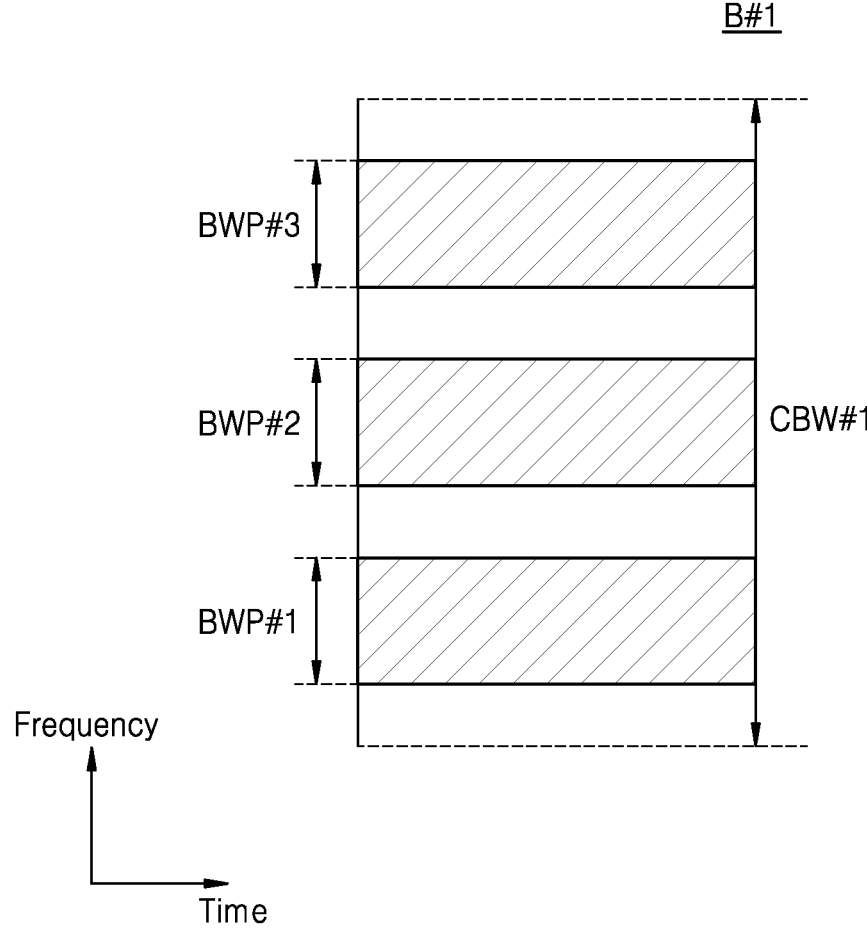
FIG. 4C is a diagram illustrating an implementation example of a bandwidth portion in a first band of a wireless communication system.
Figure 4D:
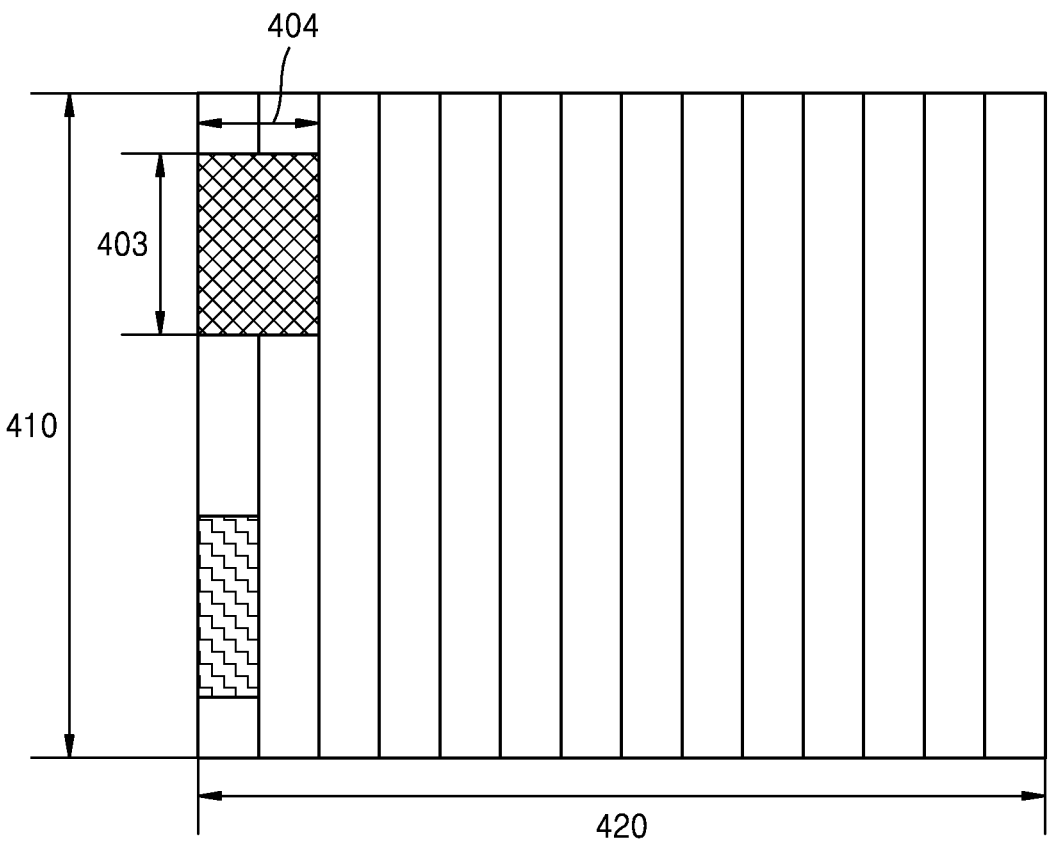
FIG. 4D is a diagram illustrating an example of a coreset in a wireless communication system.
Figure 4E:
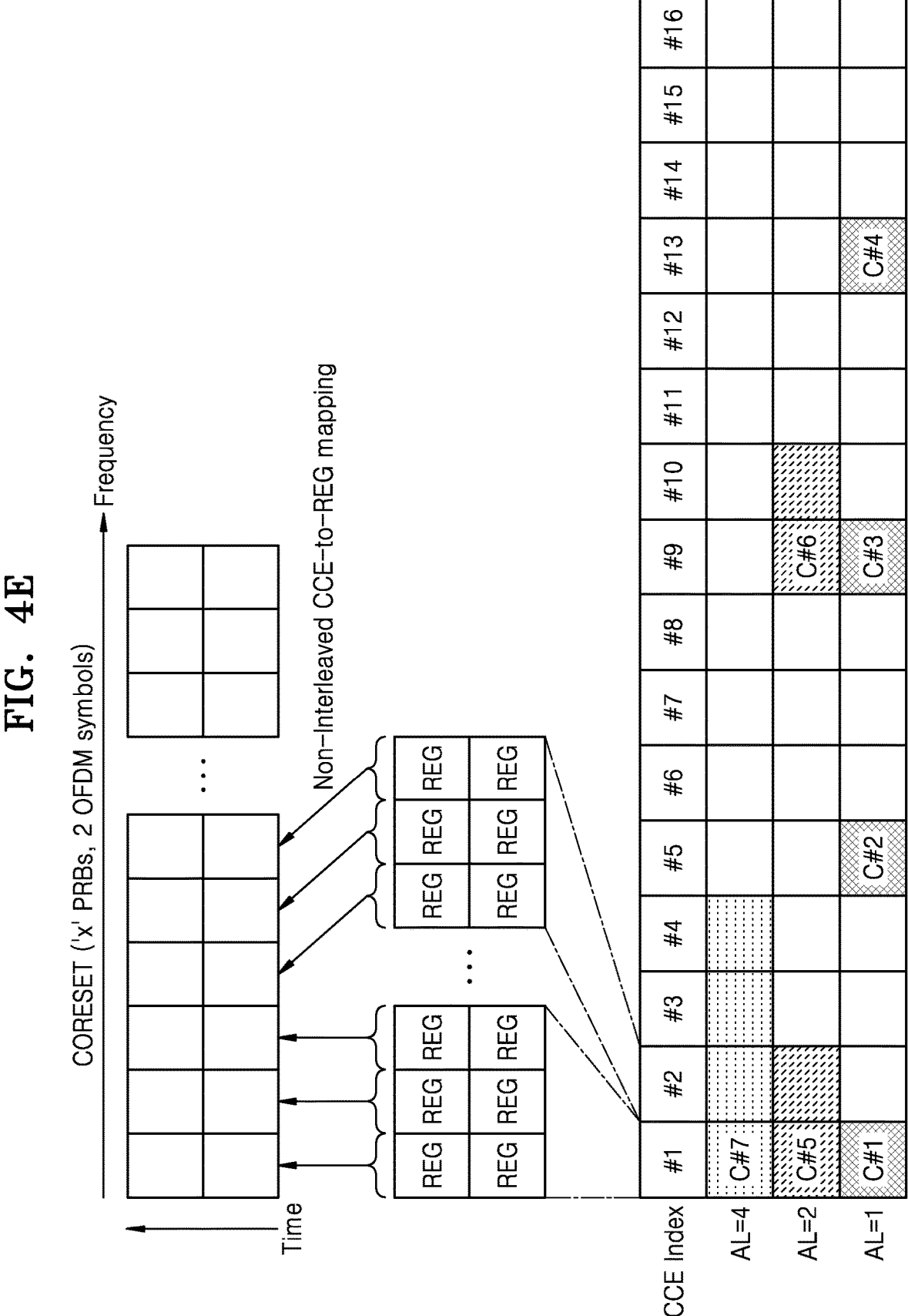
FIG. 4E is a diagram illustrating a structure of a coreset in a wireless communication system.

FIG. 4A illustrates a structure of a time-frequency domain that is a radio resource region in a wireless communication system. FIG. 4B illustrates a slot structure in a wireless communication system. FIG. 4C illustrates an implementation example of bandwidth portions BWP #1 to BWP #3 in the first band B #1 of the wireless communication system. FIG. 4D is an example of a coreset in the wireless communication system. FIG. 4E illustrates a structure of a coreset in a wireless communication system.

Referring to FIG. 4A, the horizontal axis may indicate a time domain and the vertical axis may indicate a frequency domain. A minimum transport unit in the time domain is an orthogonal frequency division multiplexing (OFDM) symbol. As an example shown in FIG. 4A, $N_{symb}$ OFDM symbols 202 may be gathered to configure one slot 206 and two slots may be gathered to configure one subframe 205. For example, a length of the slot 206 may be 0.5 ms, and a length of the subframe 205 may be 1.0 ms. However, this is an exemplary embodiment and the length of the slot 206 may vary depending on the configuration of the slot 206, and the number of slots 206 included in the subframe 205 may vary depending on the length of the slot 206. Additionally, a time-frequency domain may be defined based on slot 206 in the NR network. Additionally, radio frame 214 may be a unit of the time domain consisting of 10 subframes 205.

According to an embodiment, a minimum transport unit in the frequency domain is a subcarrier. In some cases, a bandwidth of the system transmission bandwidth may include $N_{BW}$ subcarriers 204. A basic unit of a resource in the time-frequency domain is resource element (RE) 212 that may be represented by an OFDM symbol index and a subcarrier index. Resource block (RB) 208 may be defined by $N_{symb}$ consecutive OFDM symbols 202 in the time domain and $N_{RB}$ consecutive subcarriers 210 in the frequency domain. Accordingly, one RB 208 may include $(N_{symb}*N_{RB})$ REs 212. An RB pair is a unit of two concatenating RBs on the time axis and may include $(N_{symb}*2N_{RB})$ REs 212.

As an example shown in FIG. 4A, resources in the time-frequency domain may be divided into a plurality of cells and the cells may be classified as at least one cell group. A PDCCH including DCI with scheduling information for a plurality of cells of the cell group may be transmitted to the UE through a certain cell of the cell group when scheduling for a cell group is performed by the BS. The UE may receive PDSCHs transmitted through the cells based on the DCI of the PDCCH received from a certain cell. The BS transmits the DCI including the scheduling-related information for the cell group to the UE through a certain cell, so that the UE may accurately identify scheduling for the cell group performed in the BS and adaptively perform an operation suitable therefor.

As an example shown in FIG. 4B, one radio frame 300 may be defined as 10 ms, a subframe 301 may be defined as 1 ms, and the radio frame 300 may include a total of ten subframes 301. In some examples, slot 302 or 303 may be defined by 14 OFDM symbols (i.e., the number of symbols per slot $$\left(N_{symb}^{slot}\right) = 14\text{).}$$

Subframe 301 may include slot 302 or a plurality of slots 303. The number of slots 302 and 303 per one subframe 301 may be different depending on set values μ (304 and 305) for the subcarrier spacing and the number of symbols included in slots 302 and 303. According to FIG. 4B, set values 304 and 305 are the subcarrier spacing set values. For example, when the subcarrier spacing set value is 304, one subframe 301 includes one slot 302, and when the subcarrier spacing set value is 305, one subframe 301 may include two slots 303.

According to an embodiment of the present disclosure, the number of slots per subframe may vary depending on the set value for subcarrier spacing, and the number of slots per frame may vary. The number of slots per subframe and the number of slots per frame according to the set value for each subcarrier spacing may be defined by Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Additionally, the number of slots per one subframe may vary depending on the number of symbols included in one slot. For example, the set value may be any one of 0, 1, 2, 3, 4, and the values may refer to frequencies of 15 kHz, 30 kHz, 60 kHz, 120 kHz, and 240 kHz.

According to an embodiment, a plurality of bands and the number of bands may vary depending on the set value for subcarrier spacing. As a result, cell groups for dividing a plurality of cells may also vary. The BS may perform scheduling setting for a cell group with the UE to appropriately perform scheduling for a plurality of cells that are changed according to the set value for subcarrier spacing. In some cases, the BS includes operations as described with reference to FIGS. 1 and 2. In some cases, the UE includes operations as described with reference to FIGS. 1 and 3.

Referring to FIG. 4C, the first carrier bandwidth CBW #1 of the first band B #1 may include first to third bandwidth portions BWP #1 to BWP #3. However, this is only an example and the first carrier bandwidth B #1 may include more or less than three bandwidth portions. Additionally, the first band B #1 may correspond to the first band B #1 (as shown in FIG. 1), and each of the first to fourth bands B #1 to B #4 may include the same or different number of bandwidth portions. The description of the first band B #1, given below, may also be applied to the second to fourth bands B #2 to B #4 as described with reference to FIG. 1.

Additionally, information including a bandwidth portion identifier, a bandwidth portion location, subcarrier spacing, a cyclic prefix, etc. may be individually set for the first to third bandwidth portions BWP #1 to BWP #3. The BS may provide the information on the first to third bandwidth portions BWP #1 to BWP #3 of the first band B #1 to the UE through higher layer signaling (e.g., RRC signaling). Accordingly, any one of the first to third bandwidth portions BWP #1 to BWP #3 may be activated. The decision to activate the set bandwidth portions may be provided semi-statically through RRC signaling or may be dynamically provided through MAC CE or DCI, to the UE from the BS.

According to an embodiment, the BS may activate any one of the first to third bandwidth portions BWP #1 to BWP #3 included in the first band B #1 and transmit the PDCCH including the DCI for the cell group to the UE according to an embodiment through a sub-band matching the activated bandwidth portion.

Referring to FIG. 4D, two coresets (i.e., CORESET #1 and CORESET #2) may be entirely set in bandwidth 410 on the frequency axis and in slot 420 on the time axis. The coresets CORESET #1 and CORESET #2 may be set in certain frequency resource 403 within the bandwidth 410 on the frequency axis. The coresets CORESET #1 and CORESET #2 may be set as one or a plurality of OFDM symbols on the time axis, which may be defined as duration 404 of the coresets CORESET #1 and CORESET #2. For example, the first coreset CORESET #1 may be set to have a length of two symbols, and the second coreset CORESET #2 may be set to have a length of one symbol.

Referring to FIG. 4E, the coreset CORESET may include 'x' physical resource blocks (i.e., PRBs) on the frequency axis and two OFDM symbols on the time axis. In some cases, the coreset CORESET may include a plurality of resource element groups (REG). For example, one resource element group (REG) bundle may comprise two REGs. As an example, the REG may include 12 resource elements on the frequency axis and 1 OFDM symbol on the time axis. For example, a control channel element (CCE) may include six REGs. In some examples, REGs included in CCEs #1 to #16 may be 'non-interleaved CCE-to-REG mapped'. In some examples, REGs included in CCEs #1 to #16 may be 'interleaved CCE-to-REG mapped'.

According to an embodiment, an aggregation level (AL) may indicate the number of CCEs allocated to the PDCCH. Additionally, the number of candidates may vary depending on the aggregation level AL. For example, when the aggregation level AL is 1, the first CCE (#1), the fifth CCE (#5), the ninth CCE (#9), and the thirteenth CCE (#13) may correspond to the first to fourth PDCCH candidates C #1, C #2, C #3, and C #4, respectively. Similarly, when the aggregation level AL is 2, the first and second CCEs (#1 and #2) may correspond to the fifth PDCCH candidate C #5, and the ninth and tenth CCEs (#9 and #10) may correspond to the sixth PDCCH candidate C #6. Additionally, when the aggregation level AL is 4, the first to fourth CCEs #1, #2, #3, and #4 may correspond to the seventh PDCCH candidate C #7. The PDCCH candidates may refer to a target of blind decoding for the UE to receive (or acquire the DCI from the PDCCH) the PDCCH transmitted from the BS and the aggregation level AL may be related to a search space configuration. The search space may refer to PDCCH candidates that may exist in one aggregation level AL. A plurality of search spaces may exist in one coreset and a plurality of coresets may be configured in the UE.

According to an embodiment of the present disclosure, the UE may determine the PDCCH candidates considering scheduling for the cell group of the BS. For example, the UE may determine the PDCCH candidates by using CCEs existing in at least one coreset configured for a certain cell among a plurality of cells included in the cell group. In some cases, the UE may exclude CCEs existing in coresets configured in cells other than a certain cell from the monitoring target for blind decoding, thereby increasing the blind decoding efficiency of the UE.

According to an embodiment, the UE may determine PDCCH candidates to blind-decode a coreset having a certain index in a certain cell of the cell group, a coreset associated with a search space having a certain index, or a PDCCH including DCI having a certain search space type or a certain format.

Figure 5:
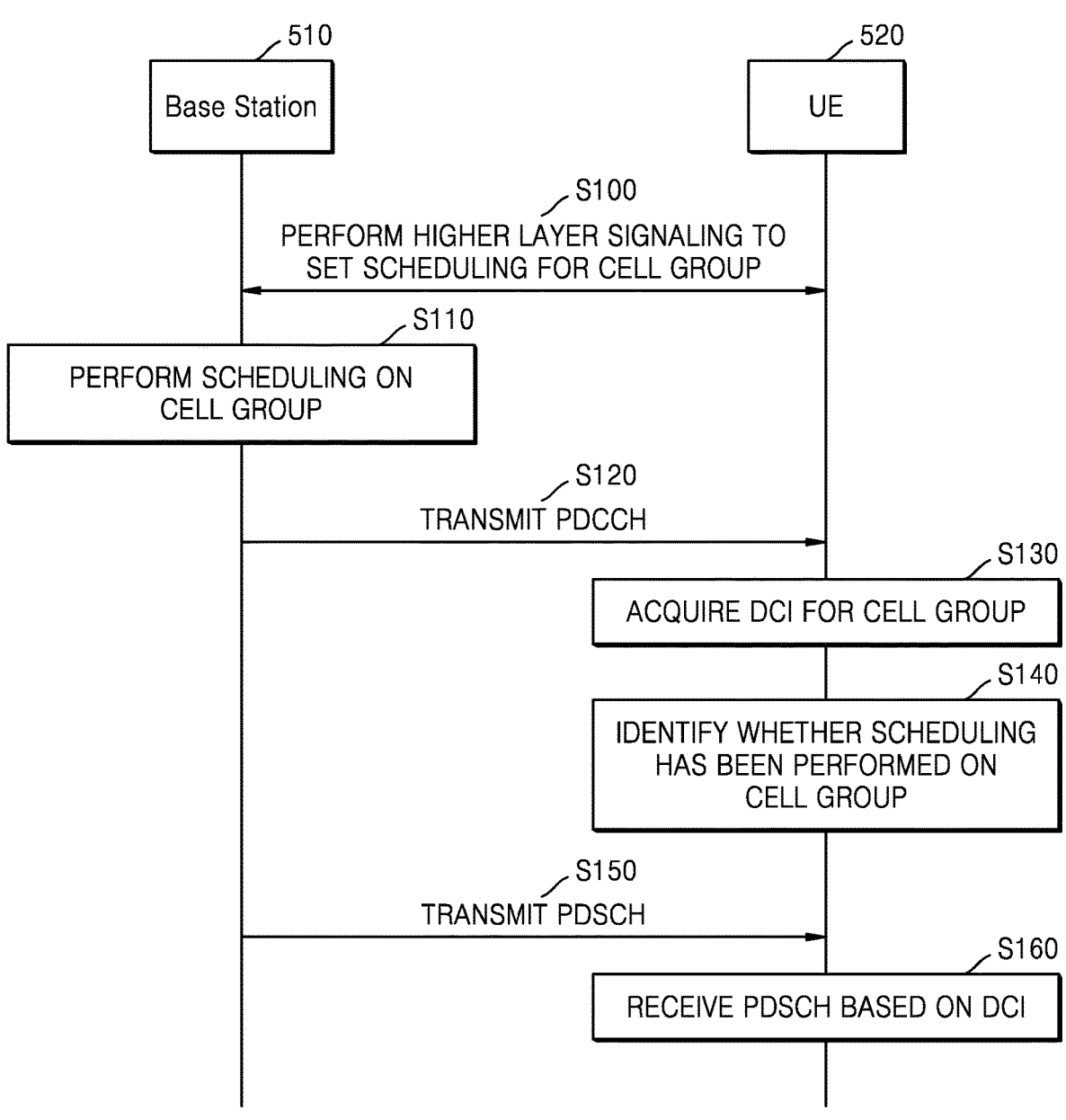
FIG. 5 is a flowchart illustrating a method of operating a wireless communication system.

According to an embodiment, the BS may generate DCI by selecting any one of carrier indices respectively corresponding to the cells included in the cell group, and transmitting the PDCCH including the generated DCI to the UE through a certain cell of the cell group. The UE may determine a CCE index in the search space based on the carrier index included in the DCI. FIG. 5 describes the BS that selects a carrier index.

FIG. 5 is a flowchart illustrating a method of operating a wireless communication system. The wireless communication system may include BS 510 and UE 520. In some cases, the BS includes operations as described with reference to FIGS. 1 and 2. In some cases, the UE includes operations as described with reference to FIGS. 1 and 3.

Referring to FIG. 5, in operation S100, BS 510 and UE 520 may perform higher layer signaling for scheduling setting for a cell group. In some cases, BS 510 may perform setting for UE 520 to identify at least one schedulable cell group, a plurality of cells included in the cell group, and whether scheduling has been performed on the cell group through higher layer signaling. In some cases, UE 520 may provide performance information of UE 520 to BS 510 through higher layer signaling. The performance information of UE 520 may include at least one of cells supportable by the UE 520, the number of supportable cells, and a method of selecting a certain cell. Additionally, the performance information of UE 520 may further include information on UE 520 that BS 510 may consider for scheduling a cell group.

In operation S110, BS 510 may perform scheduling on the cell group. According to an embodiment, BS 510 may perform scheduling including resource allocation for PDSCHs to be transmitted through the cells of the cell group. In some cases, BS 510 may perform scheduling on the cell group based on the performance information of UE 520 provided in operation S100. BS 510 may perform scheduling on cells supportable by UE 520 or a cell group matching the number of supportable cells based on the performance information of UE 520. Also, BS 510 may select a certain cell of the cell group based on the performance information of UE 520 BS 510 may generate DCI including a scheduling result of operation S110 and scheduling-related information for the cell group.

In operation S120, BS 510 may transmit a PDCCH including DCI for a plurality of cells to UE 520 through a certain cell in the cell group. According to an embodiment, BS 510 may select an arbitrary cell among the cells in the cell group as a certain cell by a first cell selection method. In some cases, BS 510 may select a predefined cell among the cells in the cell group as a certain cell by a second cell selection method. In some cases, there may be a plurality of predefined cells and a certain cell may be selected from among the predefined cells. For example, BS 510 may select a certain cell by using any one of the first cell selection method and the second cell selection method based on performance information of UE 520. For example, when the performance of UE 520 is good, the first cell selection method may be selected, and when the performance of the UE 520 is relatively poor, the second cell selection method may be selected.

In operation S130, UE 520 may acquire DCI for the cell group from the PDCCH. According to an embodiment, UE 520 may acquire DCI for the cell group by performing blind decoding on the PDCCH candidates in at least one coreset configured for a certain cell. As described above, the DCI for the cell group may include scheduling information for the cells in the cell group.

In operation S140, UE 520 may identify whether scheduling has been performed on the cell group based on the DCI. In an embodiment, the DCI may include scheduling-related information for the cell group, and UE 520 may identify whether scheduling has been performed on the cell group by the BS based on the scheduling-related information for the cell group. Additionally, UE 520 may identify a cell group on which scheduling has been performed and at least one of the cells in the cell group based on the scheduling-related information for the cell group. In some cases, UE 520 may identify whether scheduling has been performed on the cell group based on a radio network temporary identifier (RNTI) used when blind decoding on the PDCCH performed in operation S130 is successful. Accordingly, when a corresponding RNTI is the same as a certain RNTI, UE 520 may identify that the scheduling for the cell group has been performed, and thereafter, UE 520 may identify the cell group on which the scheduling has been performed and at least one of the cells in the cell group based on the scheduling-related information on the cell group.

In operation S150, BS 510 may transmit PDSCHs through the cells in the cell group. In operation S160, UE 520 may receive PDSCHs based on the DCI acquired in operation S130.

Figure 6A:
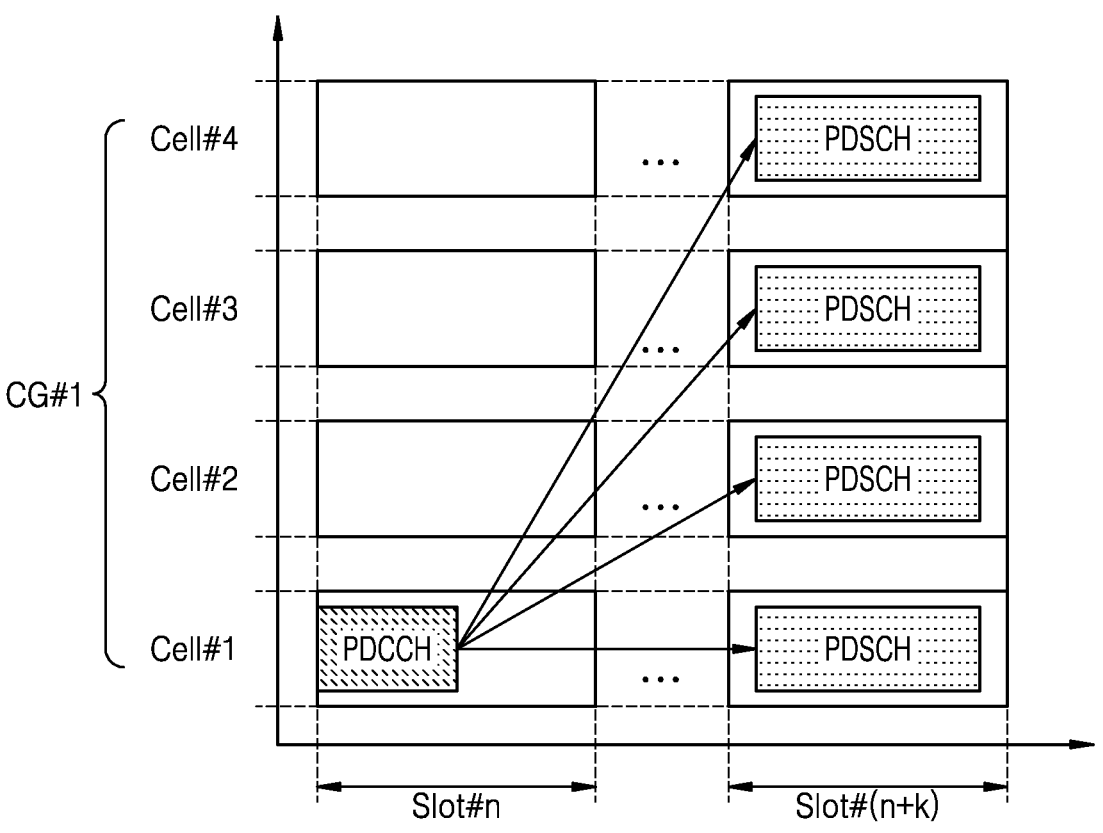
FIGS. 6A to 6C are diagrams illustrating a first cell group according to an embodiment.
Figure 6B:
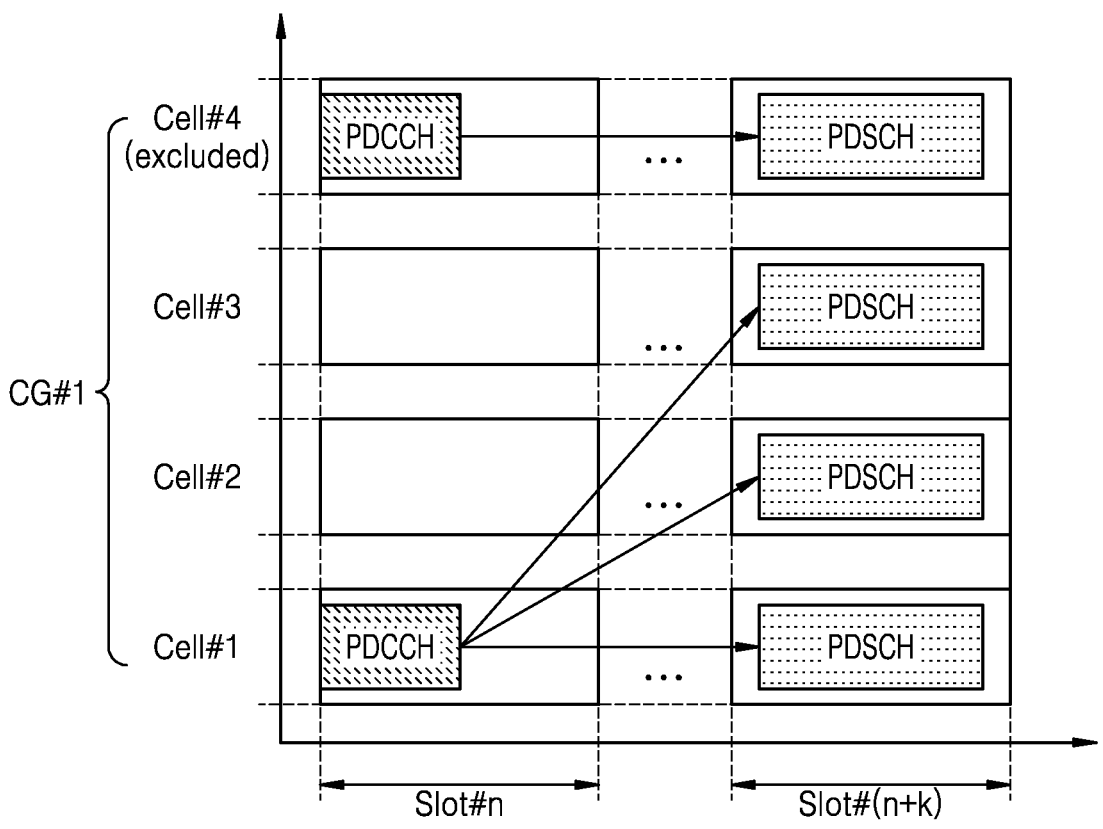
Figure 6C:
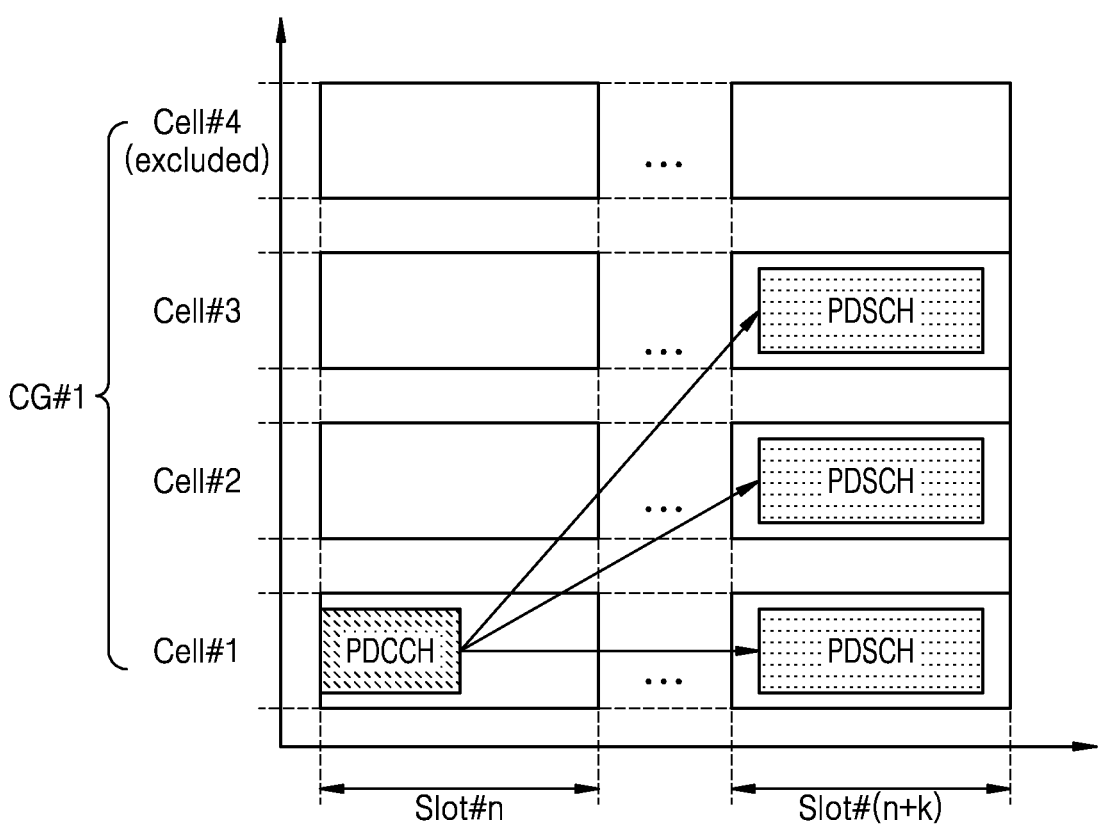
Figure 6D:
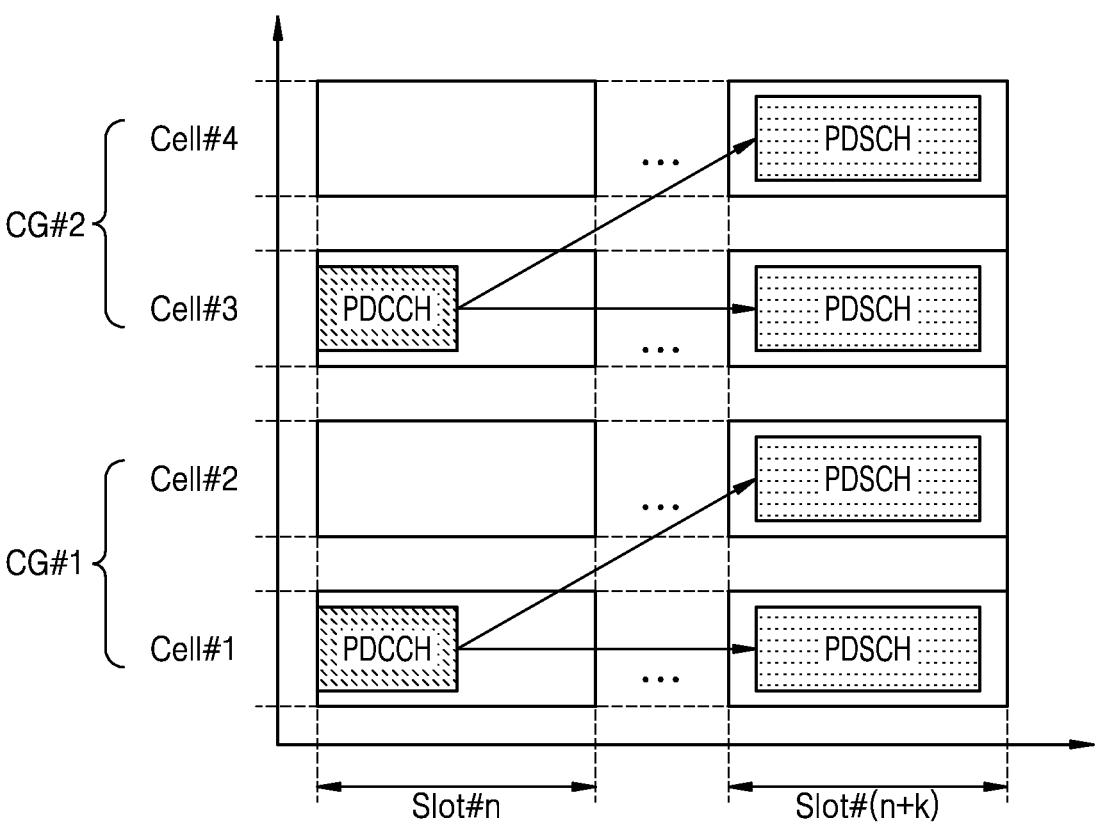
FIG. 6D is a diagram illustrating first and second cell groups.

FIGS. 6A to 6C illustrate the first cell group CG #1 and FIG. 6D illustrates the first and second cell groups CG #1 and CG #2. However, FIGS. 6A to 6D are only exemplary embodiments and the embodiments are not limited thereto. A cell group and cells included in the cell group may be set in various manners.

Referring to FIG. 6A, the first cell group CG #1 may include first to fourth cells Cell #1 to Cell #4. The BS may transmit the PDCCH including the DCI generated by performing scheduling on the first cell group CG #1 to the UE through the first cell, Cell #1 which is a certain cell in an n-th slot, Slot #n. The DCI may include scheduling-related information so that the UE may identify scheduling for the first cell group CG #1. The scheduling-related information may include at least one of information indicating the first cell group CG #1 and information indicating the first to fourth cells Cell #1 to Cell #4 included in the first cell group CG #1.

The BS may transmit PDSCHs to the UE through the first to fourth cells, i.e., Cell #1 to Cell #4 in an (n+k)-th slot Slot #(n+k). In some cases, the operations of BS and UE have been described with reference to FIGS. 1-3. The UE may receive PDSCHs through the first to fourth cells, Cell #1 to Cell #4, based on the DCI acquired from the PDCCH of the n-th slot, Slot #n.

Referring to FIG. 6B, the BS may perform scheduling on the remaining cells Cell #1 to Cell #3, except for the fourth cell Cell #4 among the first to fourth cells Cell #1 to Cell #4 of the first cell group CG #1. According to an embodiment, when the BS performs scheduling on the first cell group CG #1, a portion (e.g., fourth cell Cell #4) of the first cell group CG #1 may be excluded from scheduling. The BS may perform scheduling on the fourth cell Cell #4 separately from the scheduling on the first cell group CG #1.

The BS may transmit the PDCCH including the DCI generated by performing scheduling on the first cell group CG #1 to the UE through the first cell Cell #1, which is a cell in the n-th slot Slot #n. In some examples, the BS may transmit the PDCCH including the DCI generated by performing scheduling on the fourth cell Cell #4 to the UE through the fourth cell Cell #4 in the n-th slot Slot #n. The UE may identify the scheduling on the first cell group CG #1 in which the fourth cell Cell #4 is excluded from the DCI of the PDCCH received through the first cell Cell #1.

The BS may transmit PDSCHs to the UE through the first to fourth cells Cell #1 to Cell #4 in the (n+k)-th slot Slot #(n+k). The UE may receive PDSCHs through the first to third cells Cell #1 to Cell #3 based on the DCI acquired from the PDCCH through the first cell Cell #1, and may receive the PDSCH through the fourth cell Cell #4 based on the DCI acquired from the PDCCH through the fourth cell Cell #4.

Referring to FIG. 6C, the BS may perform scheduling on the remaining cells Cell #1 to Cell #3 except for the fourth cell Cell #4, among the first to fourth cells Cell #1 to Cell #4 of the first cell group CG #1. According to an embodiment, when performing scheduling on the first cell group CG #1, the BS may exclude a portion of the first cell group CG #1 by considering at least one of a communication environment between the BS and the UE, the amount of data to be transmitted, and supportable bands of the UE. As an example shown in FIG. 6C, the fourth cell Cell #4, which is a cell excluded from scheduling, may be a dormancy cell. Compared to FIG. 6B, the BS may not perform scheduling on the fourth cell Cell #4.

Referring to FIG. 6D, the first cell group CG #1 may include the first and second cells Cell #1 and Cell #2 and the second cell group CG #2 may include the third and fourth cells Cell #3 and Cell #4. The BS may transmit the PDCCH including the DCI generated by performing scheduling on the first cell group CG #1 to the UE through the first cell Cell

1, which is a certain cell in the n-th slot Slot #n. The BS may transmit the PDCCH including the DCI generated by performing scheduling on the second cell group CG #2 to the UE through the third cell Cell #3, which is a certain cell in the n-th slot Slot #n.

According to an embodiment of the present disclosure, the DCI of the PDCCH through the first cell Cell #1 may include scheduling-related information for the first cell group CG #1 and the DCI of the PDCCH through the third cell Cell #3 may include scheduling-related information for the second cell group CG #2. The UE may identify scheduling for the first cell group CG #1 and the second cell group CG #2 based on corresponding scheduling-related information.

As an example shown in FIG. 6D, the BS may transmit the PDSCHs to the UE through the first to fourth cells Cell #1 to Cell #4 in the (n+k)-th slot, Slot #(n+k). The UE may receive the PDSCHs through the first and second cells Cell #1 and Cell #2 based on the DCI acquired from the PDCCH through the first cell Cell #1 and may receive the PDSCHs through the third cell and fourth cells Cell #3 and Cell #4 based on the DCI acquired from the PDCCH through the third cell Cell #3.

FIGS. 7A to 7D illustrate scheduling-related information for a cell group. However, FIGS. 7A to 7D show an example of scheduling-related information for a cell group, but the embodiments are not limited thereto.

Figure 7A:
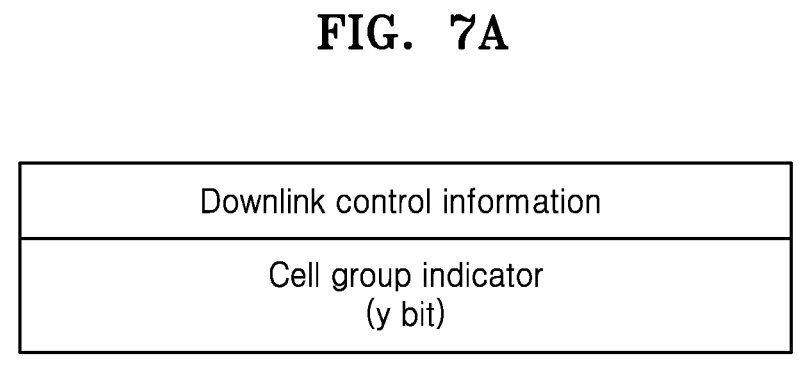
Figure 7D:
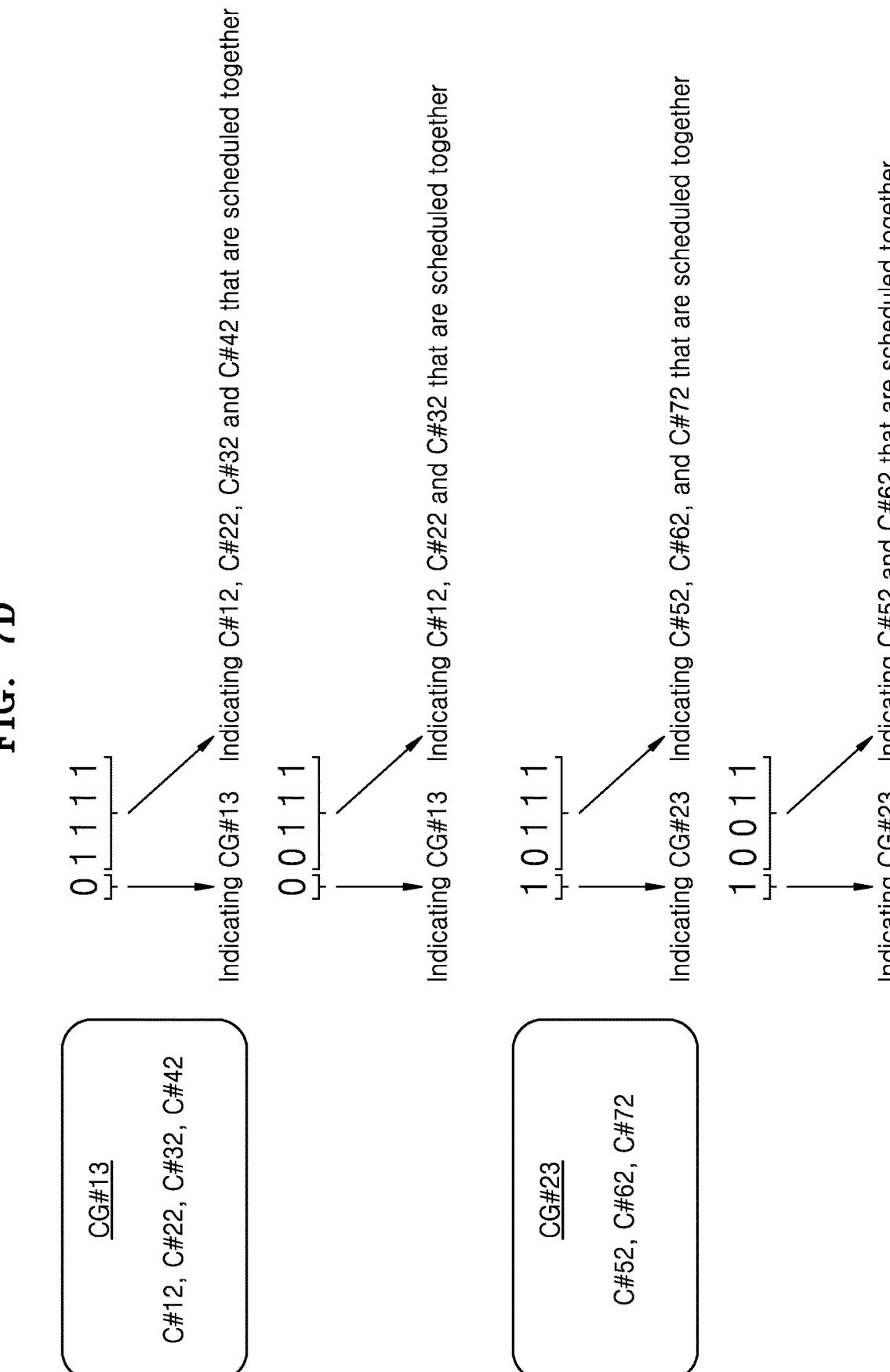

Referring to FIG. 7A, DCI may include a cell group indicator field. For example, the cell group indicator field may include y bit information. According to an embodiment, the BS may set a plurality of cell groups, that each include a plurality of cells, in scheduling setting for a cell group with the UE. A cell group indicator field according thereto is described with reference to FIG. 7B. According to an embodiment, the BS may set a plurality of cells in scheduling setting for a cell group with the UE and a cell group indicator field according thereto is described with reference to FIG. 7C. According to an embodiment, the BS may set a plurality of cell groups and a plurality of cells included in each of the plurality of cell groups in scheduling setting for a cell group with the UE. A cell group indicator field according thereto is described with reference to FIG. 7D.

As an example shown in FIG. 7B, first to fourth cell groups CG #11 to CG #41 may be configured through scheduling setting for a cell group between the BS and the UE. Although not shown in FIG. 7B, a plurality of cells included in each of the first to fourth cell groups CG #11 to CG #41 may also be configured through scheduling setting for the cell group between the BS and the UE. For example, information of the cell group indicator field may be in the form of a code and may consist of 2 bits to indicate the four cell groups CG #11 to CG #41.

As an example in FIG. 7B, the code having a value of 00 may indicate the first cell group CG #11, the code having a value of 01 may indicate the second cell group CG #21, the code having a value of 10 may indicate the third cell group CG #31, and the code having a value of 11 may indicate the fourth cell group CG #41.

According to an embodiment of the present disclosure, the BS may select any one of the cell groups CG #11 to CG #41 and perform scheduling on the cell group. In some cases, the BS may inform the UE of the scheduled cell group. The UE may identify the scheduled cell group from the BS by referring to the code of the cell group indicator field of the DCI.

Referring further to FIG. 7C, first to sixth cells C #11 to C #61 may be configured through scheduling setting for a cell group between the BS and the UE. Information of the cell group indicator field may be in a bitmap format and may consist of 6 bits to indicate six cells C #11 to C #61.

As an example in FIG. 7C, the bits of the bitmap may indicate the first to sixth cells C #1 to C #6, respectively. The bitmap having a value of 000111 may indicate the first to third cells C #11 to C #31 and the first to third cells C #11 to C #31 may be included in the first cell group CG #12. The bitmap having a value of 111000 may indicate the fourth to sixth cells C #41 to C #61 and the fourth to sixth cells C #41 to C #61 may be included in the second cell group CG #22.

According to an embodiment, the BS may select at least two of the cells C #11 to C #61 and perform scheduling on the cell groups CG #12 and CG #22 including the selected cells, and may inform the UE of the scheduled cells individually. The UE may identify a cell group scheduled from the BS by referring to a bitmap of the cell group indicator field of the DCI.

Referring to FIG. 7D, first and second cell groups CG #13 and CG #23 may be set through scheduling setting for the cell group between the BS and the UE and first to fourth cells C #12 to C #42 included in the first cell group CG #13 are set. Additionally, fifth to seventh cells C #52 to C #72 included in the second cell group CG #23 may be set. Information of the cell group indicator field is in the form of a combination of code and bitmap. For example, the information may consist of 5 bits to indicate the cells C #12 to C #72 included in each of the two cell groups CG #13 and CG #23. In some cases, the most significant bits may indicate a cell group as a code and the least significant bits may indicate cells as a bitmap.

For example, the information of the cell group indicator field having a value of '01111' may indicate that the first to fourth cells C #12 to C #42 are scheduled in the first cell group CG #13 and the information of the cell group indicator field having a value of 00111 may indicate that the first to third cells C #12 to C #14 are scheduled in the first cell group CG #13. Additionally, the information of the cell group indicator field having a value of 10111 may indicate that the fifth to seventh cells C #52 to C #72 are scheduled in the second cell group CG #23 and the information of the cell group indicator field having a value of 10011 may indicate that the fifth and sixth cells C #52 and C #62 are scheduled in the second cell group CG #23.

As an example shown in FIG. 7D, the BS may select the cell groups CG #13 and CG #23 and at least two of a plurality of cells C #12 to C #42 and C #52 to C #72 of the cell group, perform scheduling thereon, and may inform the UE of scheduled cells in the cell group. A cell not selected from the cell group may be a cell excluded from scheduling for the cell group. The UE may identify cells of a cell group scheduled from the BS by referring to a combination of a code and a bitmap of a cell group indicator field of DCI.

Figure 8:
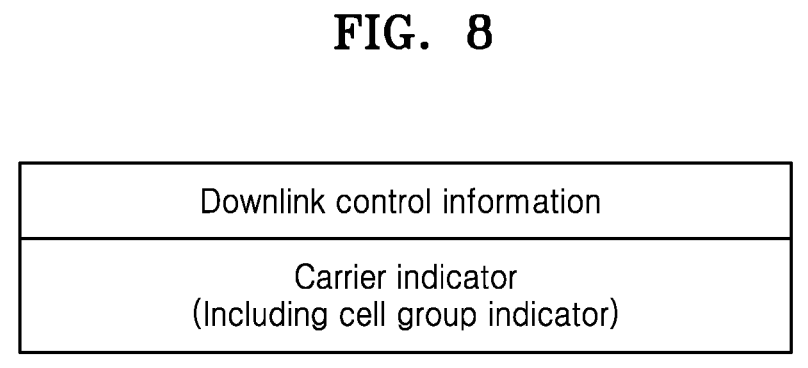
Figure 9:
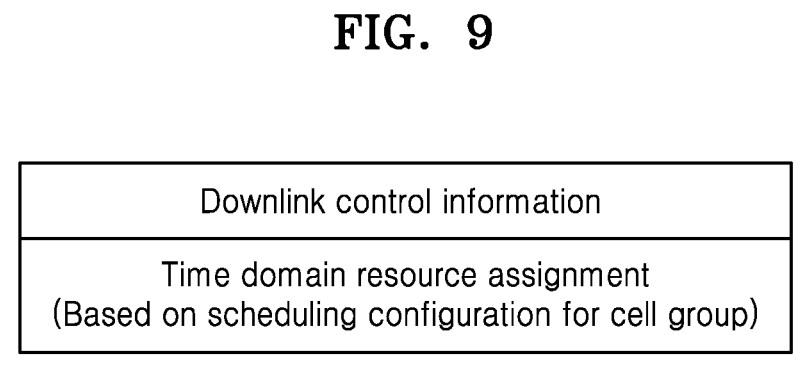

FIGS. 8 and 9 are diagrams illustrating scheduling-related information for a cell group. Referring to FIG. 8, DCI may include a carrier indicator field. The carrier indicator field may include a cell group indicator. In some cases, the BS may generate a cell group indicator indicating cells scheduled together with a certain cell that is a cell transmitting a PDCCH including DCI or a cell group including the cells. The BS may include the generated cell group indicator in the carrier indication field of the DCI. The UE may identify the scheduled cells or the scheduled cell group with reference to the carrier indicator field of the DCI. The embodiments described above with reference to FIGS. 7A to 7D may be applied to the cell group indicator to be included in the carrier indicator field.

Referring further to FIG. 9, the DCI may include a time domain resource allocation field. A table for the time domain resource allocation field may be configured through higher layer signaling. According to an embodiment, the time domain resource allocation field may be based on scheduling setting for a cell group. In some cases, the time domain resource allocation field may include information indicating a scheduled cell group or scheduled cells. Additionally, the time domain resource allocation field may include time domain resource allocation information corresponding to scheduling for the cell group. The UE may identify scheduled cells or a scheduled cell group with reference to the time domain resource allocation field of the DCI.

Figure 10A:
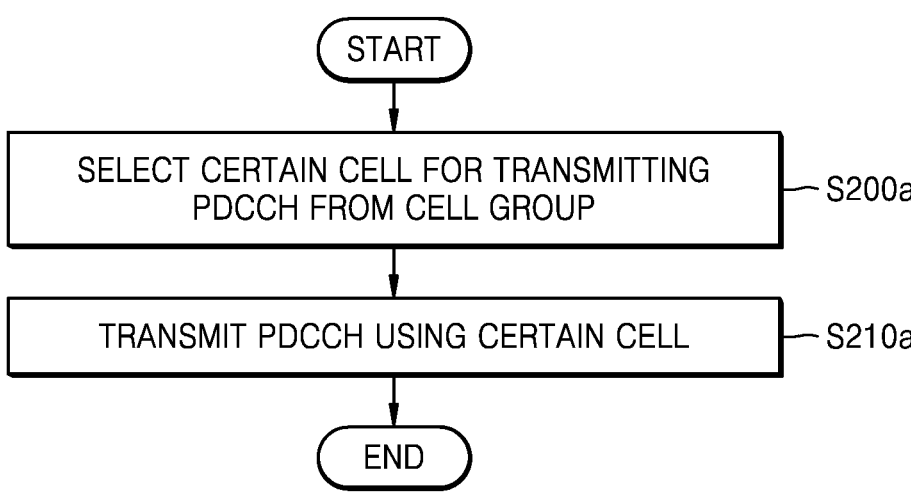
FIGS. 10A and 10B are flowcharts illustrating an operating method of a base station for selecting a certain cell.
Figure 10B:
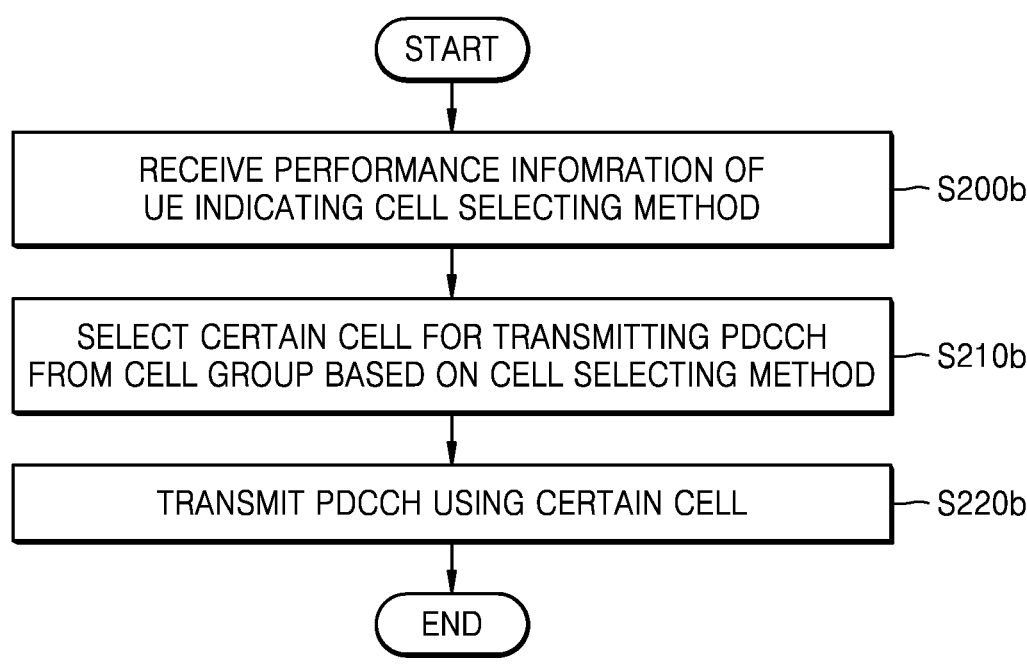

FIGS. 10A and 10B are flowcharts illustrating an operating method of a BS for selecting a certain cell. In FIGS. 10A and 10B, the BS is assumed to perform scheduling on a cell group.

Referring to FIG. 10A, in operation S200a, the BS may select a certain cell for transmitting a PDCCH in a cell group. The BS may select any one of the cells included in the cell group as a certain cell in order to transmit the PDCCH including the DCI generated by performing scheduling on the cell group. In some cases, the cells included in the cell group do not include cells excluded from scheduling (i.e., dormant cells). There may be various embodiments of a cell selection method in which the BS selects a certain cell.

For example, the BS may select an arbitrary cell, among the cells of the cell group, as a certain cell based on a first cell selection method. As an example, based on a second cell selection method, the BS may select any one of the cells which is set as a certain cell by scheduling setting, or any one of cells set as a certain cell candidate, as a certain cell. The BS may select a certain cell based on any one of the first and second cell selection methods.

In operation S210a, the BS may transmit the PDCCH to the UE using the certain cell.

Referring to FIG. 10B, in operation S200b, the BS may receive performance information of the UE indicating the cell selection method. In some cases, the BS may receive performance information of the UE indicating a cell selection method suitable for the UE's own performance through higher layer signaling.

In operation S210b, the BS may select a certain cell for transmitting the PDCCH from the cell group based on the cell selection method indicated by the performance information of the UE. The BS may select a cell selection method indicated in the performance information of the UE among the first and second cell selection methods described with reference to FIG. 10A, and select a certain cell based thereon.

In operation S220b, the BS may transmit the PDCCH to the UE using the certain cell.

Figure 11A:
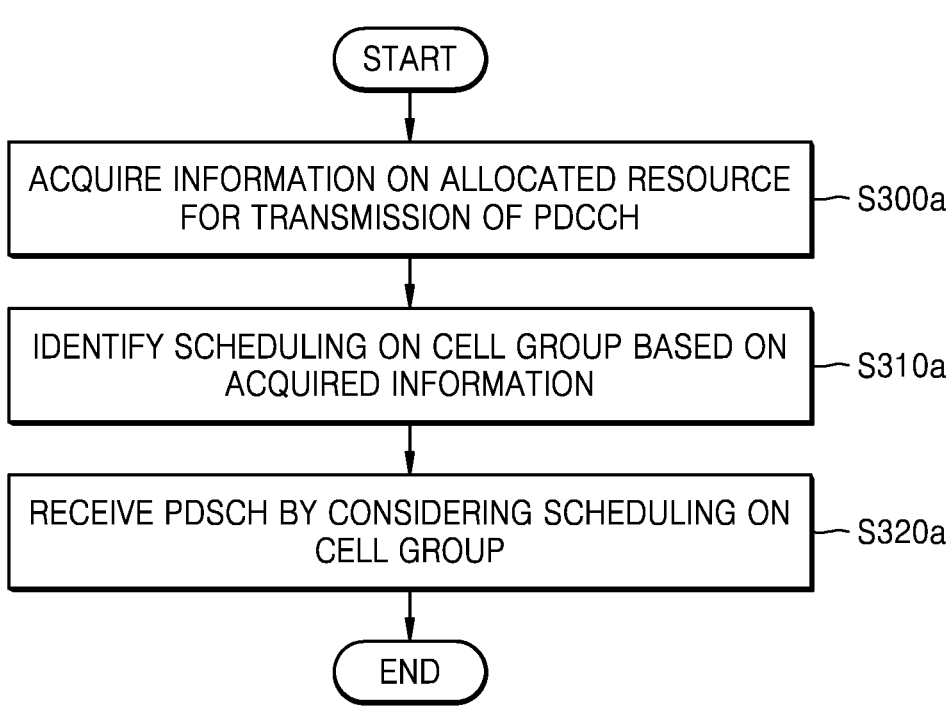
FIGS. 11A to 11C are flowcharts illustrating an operating method of a user equipment for identifying whether scheduling has been performed on a cell group.
Figure 11B:
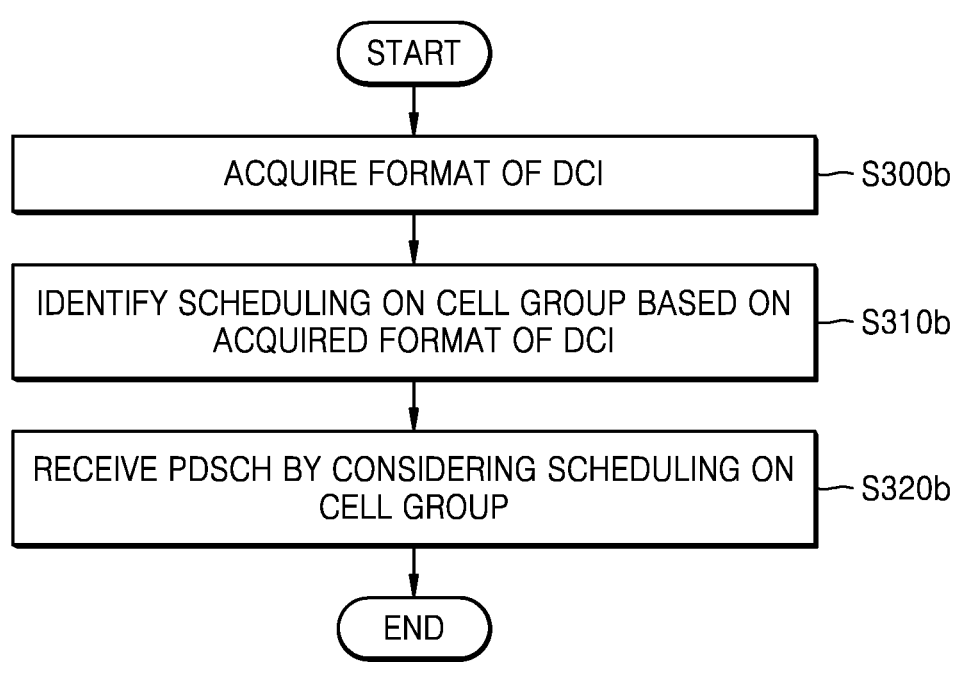
Figure 11C:
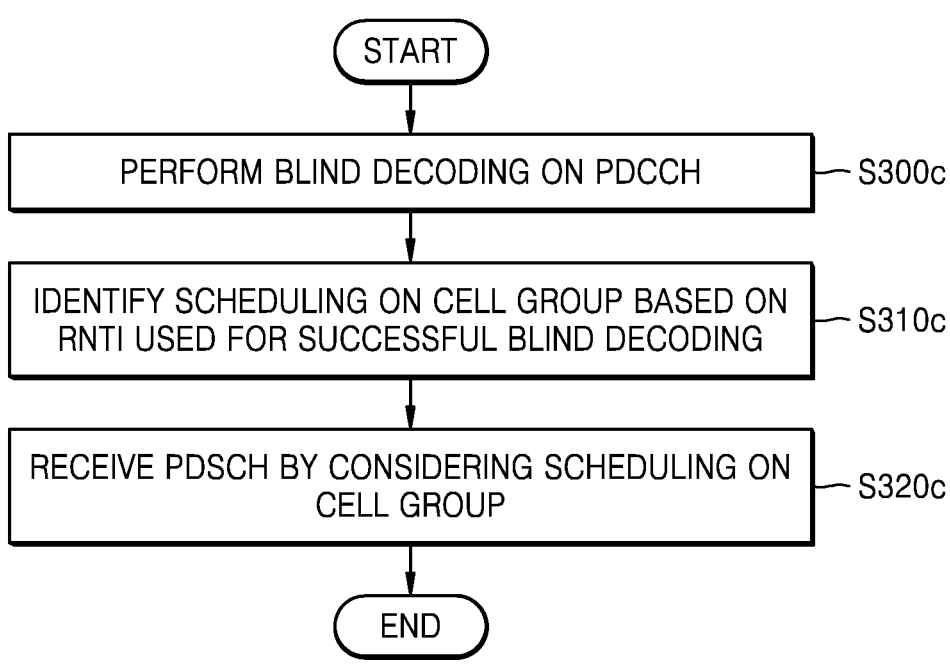

FIGS. 11A to 11C are flowcharts illustrating an operating method of a UE for identifying whether scheduling has been performed on a cell group. In FIGS. 11A to 11C, the BS is assumed to perform scheduling on a cell group.

Referring to FIG. 11A, in operation S300a, the UE may acquire information on resources allocated for PDCCH transmission from DCI. According to an embodiment, the information on the allocated resources may include at least one of an index of a coreset to which the PDCCH is transmitted and an index of a search space associated with the coreset to which the PDCCH is transmitted.

In operation S310a, the UE may identify scheduling for the cell group based on the information acquired in operation S300a. In some cases, the UE may identify scheduling on the cell group based on at least one of whether the index of the coreset included in the acquired information corresponds to a certain index of the coreset and whether the index of the search space corresponds to a certain index of the search space. At least one of the certain index of the coreset and the certain index of the search space may be set through scheduling setting for the cell group. Thus, when the index of the coreset included in the acquired information corresponds to a certain index of the coreset or when the index of the search space corresponds to a certain index of the search space, the UE may identify that scheduling has been performed on the cell group.

In operation S320a, the UE may receive PDCSHs corresponding to the cell group by considering scheduling for the cell group. That is, the UE may receive PDSCHs transmitted from a plurality of cells of the cell group based on the DCI.

Referring further to FIG. 11B, in operation S300b, the UE may acquire a format of the DCI from the DCI. In operation S310b, the UE may identify the scheduling for the cell group based on the acquired format of the DCI. In some cases, the UE may identify the scheduling for the cell group based on whether the acquired format of the DCI corresponds to a certain format of the DCI. A certain index of the DCI may be set through scheduling setting for the cell group. As a result, when the acquired format of the DCI corresponds to a certain format of the DCI, the UE may identify that scheduling has been performed on the cell group. In operation S320b, the UE may receive PDCSHs corresponding to the cell group by considering scheduling for the cell group.

Referring further to FIG. 11C, in operation S300c, the UE may perform blind decoding on the PDCCH transmitted from the BS through a certain cell. In operation S310c, the UE may identify the scheduling for the cell group based on an RNTI used when blind decoding is successful. In some cases, the UE may identify the scheduling for the cell group based on whether the corresponding RNTI corresponds to a certain RNTI. A certain RNTI may be configured through scheduling setting for the cell group. The UE may identify that scheduling has been performed on the cell group when the corresponding RNTI corresponds to a certain RNTI. In operation S320c, the UE may receive PDCSHs corresponding to the cell group by considering scheduling for the cell group.

Figure 12A:
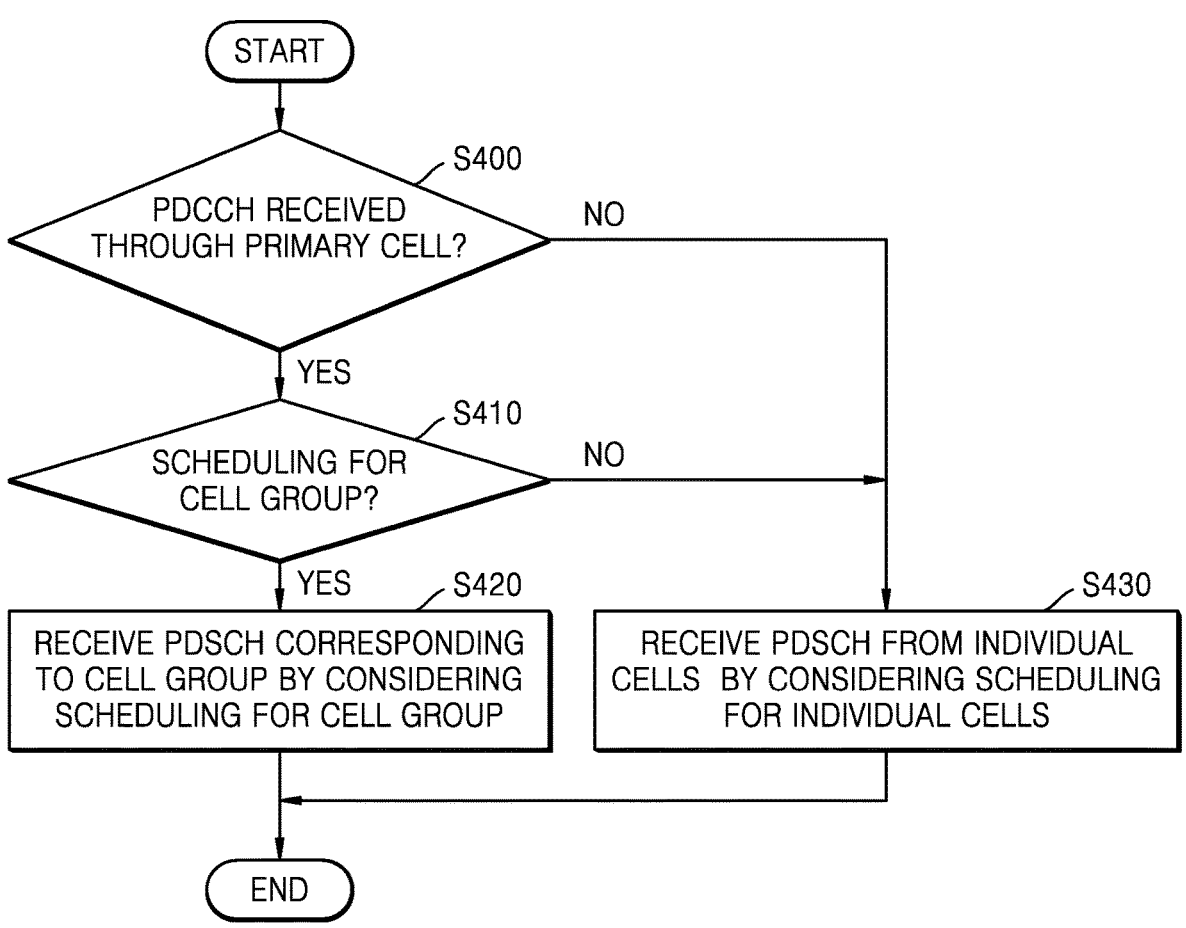
FIG. 12A is a diagram illustrating an operating method of a user equipment for identifying whether scheduling has been performed on a cell group.
Figure 12B:
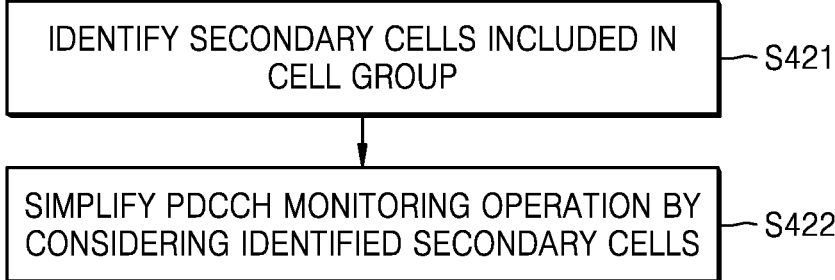
FIG. 12B is a flowchart illustrating a detailed operating method of a user equipment in operation S420 of FIG. 12A.

FIG. 12A is a flowchart illustrating an operating method of a UE for identifying whether scheduling for a cell group is performed and FIG. 12B is a flowchart illustrating a detailed operating method of the UE in operation S420 of FIG. 12A.

Referring to FIG. 12A, in operation S400, the UE may determine whether the PDCCH is received through a primary cell. The primary cell may refer to a cell used in an initial connection establishment procedure or a connection re-establishment procedure with a BS.

When operation S400 is YES, the UE may identify whether scheduling is for a cell group in operation S410. Accordingly, when the PDCCH is received through the primary cell, the UE may identify whether the corresponding PDCCH includes DCI conforming to the scheduling for the cell group. Performing operation S410 when receiving the PDCCH through the primary cell may be configured through scheduling setting for a cell group.

When operation S410 is YES, the UE may receive PDCSHs corresponding to the cell group by considering scheduling on the cell group in operation S420.

When operation S400 or operation S410 is NO, the UE may receive PDSCHs from individual cells by considering scheduling for the individual cells in operation S430. Thus, the UE may receive PDCCHs from individual cells, acquire DCIs from the received PDCCHs, and receive PDCSHs from individual cells based on the acquired DCIs.

Referring to FIG. 12B, in operation S421, the UE may identify secondary cells included in the cell group. In operation S422, the UE may simplify the PDCCH monitoring operation by considering the identified secondary cells. In some cases, the UE may recognize that the PDCCHs are not transmitted through the secondary cells included in the cell group from the BS, and thus, the UE may exclude CCEs existing in coresets configured in the secondary cells from monitoring target for blind decoding. As a result, the UE may perform blind decoding on at least one coreset configured in the primary cell.

Figure 13:
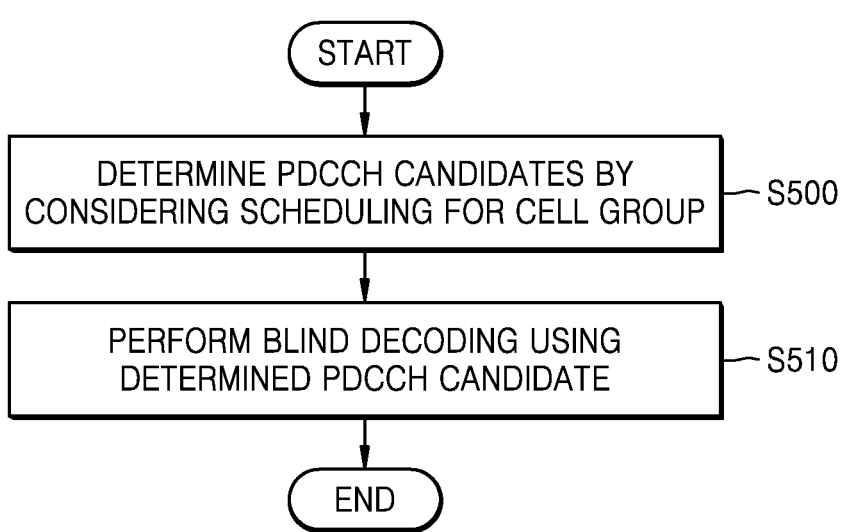
FIG. 13 is a flowchart illustrating an operating method of a user equipment performing blind decoding.

FIG. 13 is a flowchart illustrating an operating method of a UE performing blind decoding. In FIG. 13, the BS is assumed to perform scheduling on a cell group.

Referring to FIG. 13, in operation S500, the UE may determine PDCCH candidates by considering scheduling for a cell group. The UE may determine PDCCH candidates based on at least one coreset configured for the certain cell because the PDCCH is transmitted through a certain cell among the cells of the cell group scheduled by the BS. In some cases, the UE may count the number of non-overlapping CCEs to determine PDCCH candidates.

In operation S510, the UE may perform blind decoding using the determined PDCCH candidates. The UE may acquire DCI from the PDCCH through a certain cell upon successful blind decoding.

Figure 14:
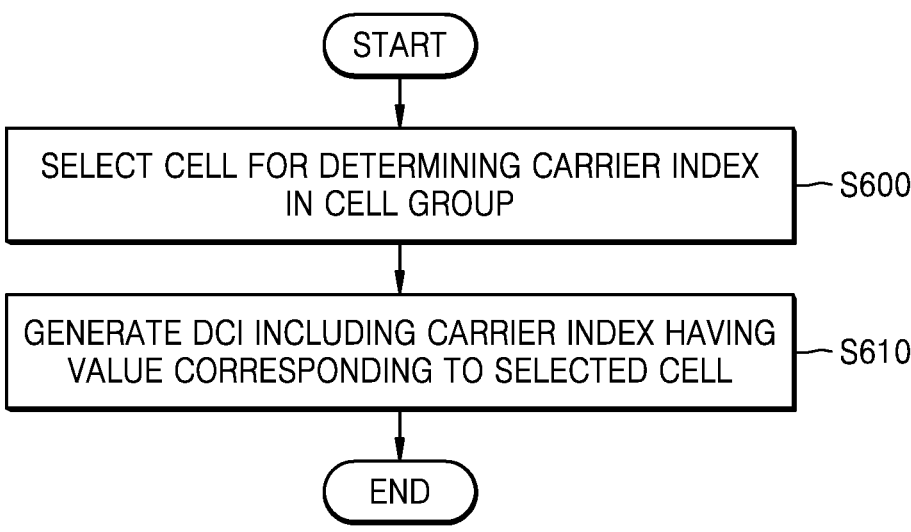
FIG. 14 is a flowchart illustrating an operating method of a base station to determine a carrier index.

FIG. 14 is a flowchart illustrating an operating method of a BS for determining a carrier index. In FIG. 14, the BS is assumed to perform scheduling for a cell group.

Referring to FIG. 14, in operation S600, the BS may select a cell for determining a carrier index in a cell group. The carrier index may be used when determining a CCE index in a search space for blind decoding. According to an embodiment, the BS may select a certain cell as a cell for determining the carrier index in the cell group. In some cases, the BS may select a cell having the maximum or minimum carrier index among the cells of the cell group as a cell for determining the carrier index in the cell group.

In operation S610, the UE may generate DCI including a carrier index having a value corresponding to the selected cell.

Figure 15:
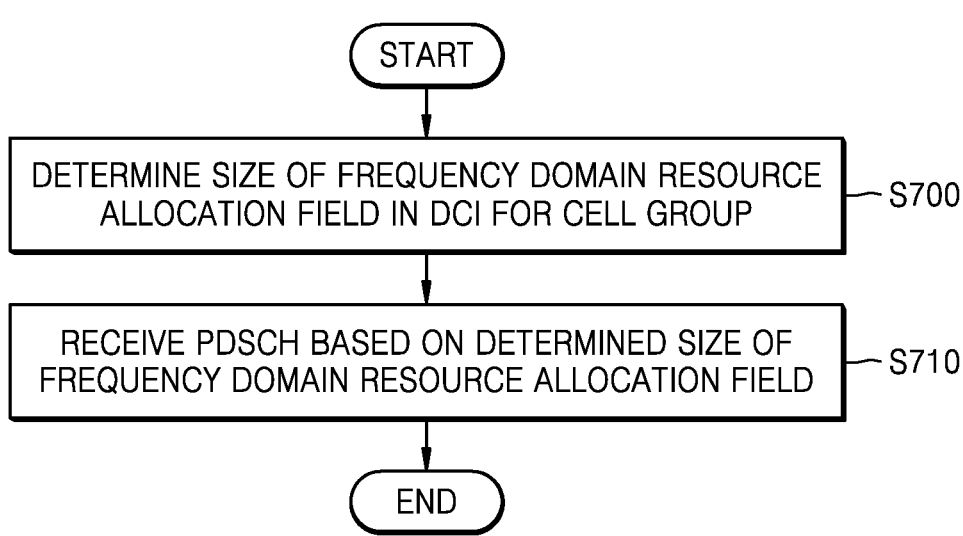
FIG. 15 is a flowchart illustrating an operating method of a user equipment to determine a size of a frequency domain resource allocation field.

FIG. 15 is a flowchart illustrating an operating method of a UE for determining a size of a frequency domain resource allocation field. According to an embodiment, the BS performs scheduling for a cell group.

Referring to FIG. 15, in operation S700, the UE may determine the size of the frequency domain resource allocation field in DCI for the cell group. In some cases, the UE may determine the size of the frequency domain resource allocation field based on a cell having the maximum bandwidth portion or carrier bandwidth among the cells of the cell group. According to an embodiment, the UE may determine the size of the frequency domain resource allocation field based on the cell having the maximum bandwidth portion or carrier bandwidth among the cells of the cell group and at least one cell (not included in the cell group) through which the PDCCH is transmitted. In operation S710, the UE may receive PDSCHs transmitted from the cells of the cell group or at least one cell (not included in the cell group) and a PDCCH are transmitted based on the determined size of the frequency domain resource allocation field.

Figure 16:
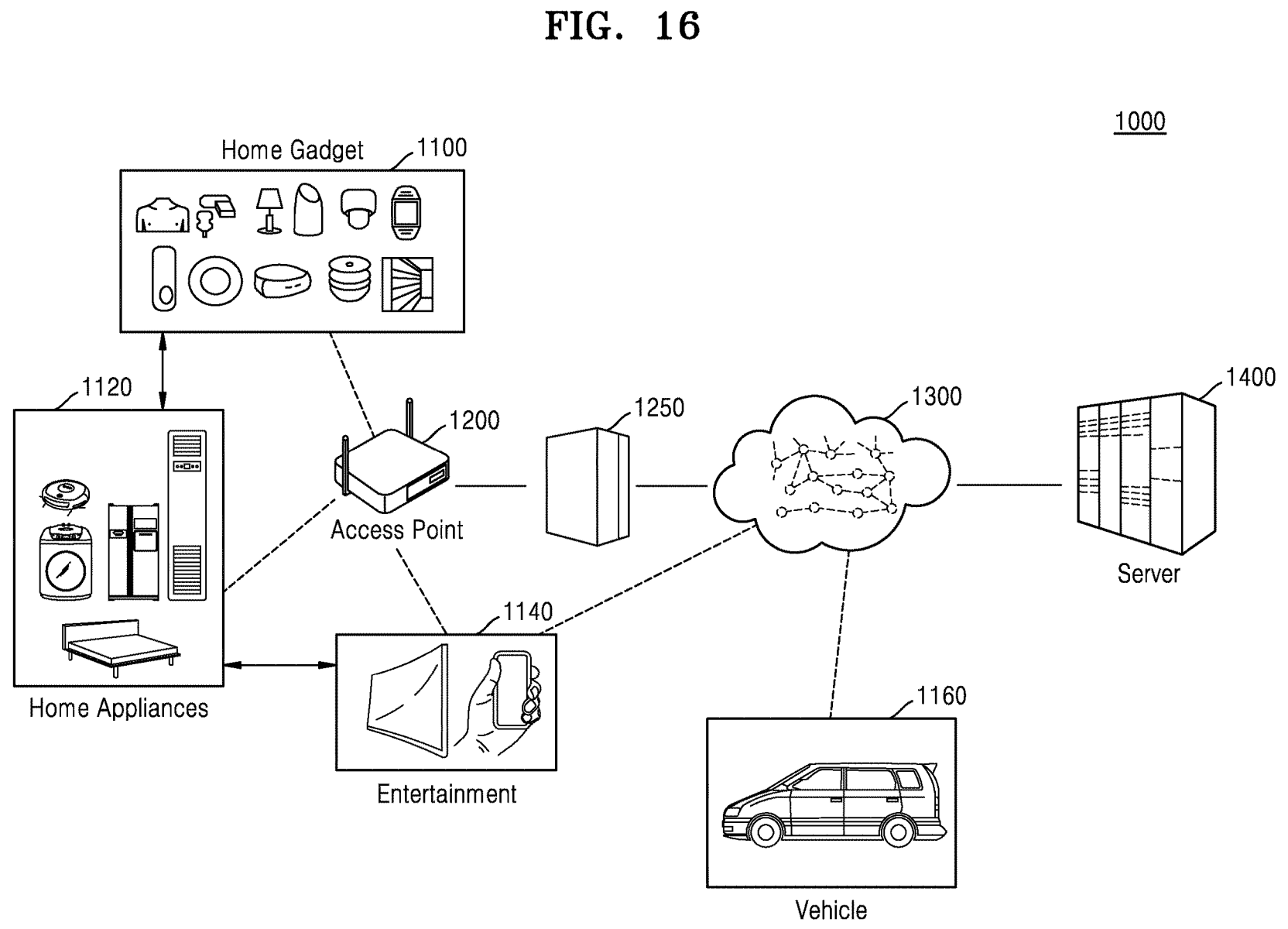

FIG. 16 is a conceptual diagram illustrating an Internet of things (IoT) network system 1000 to which embodiments are applied.

Referring to FIG. 16, the IoT network system 1000 may include a plurality of IoT devices (e.g., home gadgets 1100, home appliances 1120, entertainment 1140, and vehicle 1160), an access point AP 1200, a gateway 1250, a wireless network 1300, and a server 1400. IoT may refer to a network between objects using wired/wireless communication.

Each of the IoT devices 1100, 1120, 1140, and 1160 may form a group according to the characteristics of each IoT device. For example, the IoT devices may be grouped into a home gadget group 1100, a home appliance/furniture group 1120, an entertainment group 1140, or a vehicle group 1160. The plurality of IoT devices 1100, 1120, and 1140 may be connected to a communication network or connected to other IoT devices through the AP 1200. The AP 1200 may be embedded in one IoT device. The gateway 1250 may change a protocol to connect the AP 1200 to an external wireless network. The IoT devices 1100, 1120, and 1140 may be connected to an external communication network through the gateway 1250. The wireless network 1300 may include the Internet and/or a public network. The IoT devices 1100, 1120, 1140, and 1160 may be connected to the server 1400 providing a predefined service through the wireless network 1300 and a user may use a service through at least one of the IoT devices 1100, 1120, 1140, and 1160.

According to embodiments, the IoT devices 1100, 1120, 1140, and 1160 may perform scheduling on a cell group including a plurality of cells corresponding to a plurality of bands, and accordingly, the IoT devices 1100, 1120, 1140, and 1160 may identify scheduling for a cell group and perform communication based on an identifying result.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method of wireless communication, the method comprising:

transmitting, to a base station (BS), performance information of a user equipment (UE) associated with scheduling for a cell group including a plurality of cells, wherein the performance information of the UE indicates a cell selection method suitable for scheduling through higher layer signaling;

selecting, by the BS, a certain cell from the cell group based on the cell selection method indicated by the performance information of the UE;

receiving a physical downlink control channel (PDCCH) from the BS through the certain cell of the cell group, wherein the PDCCH corresponds to the cell group;

acquiring downlink control information (DCI) from the PDCCH;

identifying whether scheduling has been performed on the cell group based on the DCI; and receiving physical downlink shared channels (PDSCHs) from the BS based on the DCI, wherein the PDSCHs correspond to the cell group and are received through the plurality of cells, wherein the cell selection method corresponds to one of a first cell selection method and a second cell selection method, wherein an arbitrary cell is selected from among the plurality of cells as the certain cell based on the first cell selection method, and wherein a predefined cell is selected from one or more predefined cells in the plurality of cells as the certain cell based on the second cell selection method.

2. The method of claim 1, further comprising:

performing the higher layer signaling for scheduling setting for the BS and the cell group.

3. The method of claim 2, wherein the scheduling setting for the cell group includes setting for a plurality of cell groups, wherein the plurality of cell groups include the cell group and cells included in each of the plurality of cell groups.

4. The method of claim 1, wherein the performance information further includes at least one of cells supportable by the UE, and the number of supportable cells.

5. The method of claim 1, wherein the identifying of whether scheduling has been performed on the cell group further includes:

identifying the cell group based on a cell group indicator field included in the DCI.

6. The method of claim 5, wherein the identifying of the cell group includes identifying the cell group based on a value of a code of the cell group indicator field.

7. The method of claim 5, wherein the identifying of the cell group includes identifying the plurality of cells based on a value of a bitmap of the cell group indicator field.

8. The method of claim 5, wherein the identifying of the cell group includes:

identifying the cell group based on some of bits of the cell group indicator field and identifying the plurality of cells based on the rest of the bits of the cell group indicator field.

9. The method of claim 1, wherein the identifying of whether scheduling has been performed on the cell group includes identifying whether scheduling has been performed on the cell group based on information on resources allocated for transmission of the PDCCH included in the DCI.

10. The method of claim 1, wherein the identifying of whether scheduling has been performed on the cell group includes identifying whether scheduling has been performed on the cell group based on a format of the DCI.

11. The method of claim 1, wherein the identifying of whether scheduling has been performed on the cell group includes identifying whether scheduling has been performed on the cell group based on a radio network temporary identifier (RNTI) used when blind decoding for the PDCCH is successful.

12. The method of claim 1, further comprising:

determining PDCCH candidates considering scheduling for the cell group.

13. The method of claim 1, wherein the DCI includes a carrier index having a value corresponding to any one of the plurality of cells.

14. The method of claim 1, wherein the receiving of the PDSCHs corresponding to the cell group through the plurality of cells includes determining a size of a frequency domain resource allocation field included in the DCI based on a cell having a largest bandwidth portion or matching a largest band, among the plurality of cells.

15. A method of a base station (BS), the method comprising:

performing higher layer signaling for scheduling setting for a user equipment (UE) and a cell group, wherein the performing comprises:

receiving performance information of the UE associated with scheduling for the cell group including a plurality of cells, wherein the performance information of the UE indicates a cell selection method suitable for scheduling through the higher layer signaling, and selecting a certain cell from the cell group based on the cell selection method indicated by the performance information of the UE;

generating downlink control information (DCI) including information indicating at least one of the cell group and the plurality of cells included in the cell group based on the higher layer signaling;

scheduling a physical downlink control channel (PDCCH) including the DCI based on the selected certain cell and corresponding to the cell group; and transmitting the scheduled PDCCH to the UE, wherein the cell selection method corresponds to one of a first cell selection method and a second cell selection method, wherein an arbitrary cell is selected from among the plurality of cells as the certain cell based on the first cell selection method, and wherein a predefined cell is selected from one or more predefined cells in the plurality of cells as the certain cell based on the second cell selection method.

16. The method of claim 15, wherein the generating of the DCI includes selecting the cell group including the plurality of cells matching the performance information.

17. The method of claim 15, wherein the number of the plurality of cells is at least two.

18. A method of wireless communication, the method comprising:

transmitting, to a base station (BS), performance information of a user equipment (UE) associated with scheduling for a cell group including a plurality of cells, wherein the performance information of the UE indicates a cell selection method suitable for scheduling through higher layer signaling;

selecting, by the BS, a first cell from the cell group based on the cell selection method indicated by the performance information of the UE;

receiving a physical downlink control channel (PDCCH) from the BS using the first cell of the cell group;

acquiring downlink control information (DCI) from the PDCCH, wherein the DCI includes scheduling information for the first cell and a second cell of the cell group; and receiving physical downlink shared channels (PDSCHs) from BS based on the DCI using the first cell and the second cell, wherein the cell selection method corresponds to one of a first cell selection method and a second cell selection method, wherein an arbitrary cell is selected from among the plurality of cells as the first cell based on the first cell selection method, and wherein a predefined cell is selected from one or more predefined cells in the plurality of cells as the first cell based on the second cell selection method.

* * * * *